(12) United States Patent
Okamoto et al.

(10) Patent No.: US 11,491,799 B2
(45) Date of Patent: Nov. 8, 2022

(54) PRINTING APPARATUS

(71) Applicant: SCREEN HOLDINGS CO., LTD., Kyoto (JP)

(72) Inventors: Akisumi Okamoto, Kyoto (JP); Mitsuhiro Yoshida, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 145 days.

(21) Appl. No.: 17/018,433

(22) Filed: Sep. 11, 2020

(65) Prior Publication Data

US 2021/0094305 A1 Apr. 1, 2021

(30) Foreign Application Priority Data

Sep. 30, 2019 (JP) .............................. JP2019-178642

(51) Int. Cl.
- *B41J 2/175* (2006.01)
- *G06N 20/00* (2019.01)
- *B41J 29/393* (2006.01)
- *B41J 2/21* (2006.01)

(52) U.S. Cl.
CPC ......... *B41J 2/17566* (2013.01); *B41J 2/2146* (2013.01); *B41J 29/393* (2013.01); *G06N 20/00* (2019.01); *B41J 2002/17569* (2013.01)

(58) Field of Classification Search
CPC .......... B41J 29/393; B41J 2002/17569; G06N 20/00
See application file for complete search history.

(56) References Cited

U.S. PATENT DOCUMENTS

| | | | |
|---|---|---|---|
| 9,162,475 | B1 | 10/2015 | Wozniak et al. |
| 2011/0134178 | A1 | 6/2011 | Chiwata |
| 2011/0273502 | A1* | 11/2011 | Eun ........................ B41J 25/001 347/14 |
| 2012/0113176 | A1 | 5/2012 | Folkins et al. |
| 2013/0321512 | A1 | 12/2013 | Chen et al. |
| 2018/0272768 | A1 | 9/2018 | Usumoto et al. |

(Continued)

FOREIGN PATENT DOCUMENTS

| | | |
|---|---|---|
| JP | 2011-121237 A | 6/2011 |
| JP | 2014-144608 A | 8/2014 |
| JP | 2015-116709 A | 6/2015 |

(Continued)

*Primary Examiner* — Sharon Polk
(74) *Attorney, Agent, or Firm* — McDermott Will & Emery LLP

(57) ABSTRACT

A transport section transports a continuous printing paper in a predetermined transport direction. A first print section ejects first ink to the printing paper. A second print section is provided in a downstream side of the first print section in the transport direction, and ejects second ink to the printing paper. An ink amount estimating section estimates an amount of ink ejected to the printing paper from before printing by the first print section to before printing by the second print section, based on print data. A deviation amount obtaining section obtains a deviation amount between a print position by the first print section and a print position by the second print section at least based on the estimated ink amount. A print control section controls the print position by the second print section based on the deviation amount.

20 Claims, 13 Drawing Sheets

(56) References Cited

U.S. PATENT DOCUMENTS

2018/0272775 A1 9/2018 Muramatsu et al.
2019/0270303 A1 9/2019 Fernandez Espasa et al.

FOREIGN PATENT DOCUMENTS

| JP | 6091953 B2 * | 3/2017 | ............ B41J 2/2146 |
| JP | 2018-162161 A | 10/2018 | |
| WO | 2017/051796 A1 | 3/2017 | |

* cited by examiner

TRANSPORT DIRECTION

TRANSPORT DIRECTION

WIDTH DIRECTION

PRINTING APPARATUS

BACKGROUND OF THE INVENTION

Field of the Invention

The present invention relates to a printing apparatus, especially to a printing apparatus that ejects ink in turn from a plurality of print sections to a print base material that is being transported.

Description of Related Art

Conventionally, there is known an ink-jet type color printing apparatus that transports a continuous print base material in a longitudinal direction and ejects ink of colors different from each other in turn from a plurality of print sections to the print base material that is being transported. A typical ink-jet type color printing apparatus ejects black, cyan, magenta, and yellow ink in turn from four print sections to the print base material that is being transported. Hereinafter, a longitudinal direction of the print base material is referred to as a transport direction, and a lateral direction thereof is referred to as a width direction.

The ink-jet type color printing apparatus performs printing of a plurality of colors in turn using a plurality of print sections. Thus, print positions may deviate among the plurality of colors. Such a deviation of the print position is also called a misregister. If the print positions deviate among the plurality of colors, quality of a printed matter deteriorates greatly. Thus, in a color printing apparatus, it is necessary to prevent the deviation of the print position among the plurality of colors. Furthermore, in a double-sided printing apparatus, it is necessary to prevent the deviation of the print position between a front surface and a rear surface.

Methods for preventing the deviation of the print position in the color printing apparatus are disclosed in following two documents, for example. International Publication No. 2017/51796 discloses a printing apparatus that obtains a deviation direction and a deviation amount of a print position in a transport direction based on print results of two kinds of detecting charts. Japanese Laid-Open Patent Publication No. 2018-162161 discloses a base material processing apparatus that detects positions in a width direction of an edge of a base material using two detection sections and obtains a position in a transport direction or a deviation amount of a transport speed of the base material based on two detection results.

Methods for preventing the deviation of the print position in the double-sided printing apparatus are disclosed in following three documents, for example. Japanese Laid-Open Patent Publication No. 2014-144608 discloses a printing apparatus that obtains extension/shrink information in a width direction of printing media after front surface printing based on information about the printing media and information at the time of the front surface printing, and performs a register matching correction based on the obtained extension/shrink information when performing rear surface printing. Japanese Laid-Open Patent Publication No. 2011-121237 discloses a printing apparatus that predicts an extension/shrink amount of a paper that occurs from when ink is provided in front surface printing to when rear surface printing is started, and corrects at least one of front surface image data and rear surface image data based on an image correction amount calculated based on the predicted extension/shrink amount. Japanese Laid-Open Patent Publication No. 2015-116709 discloses an image processing apparatus that generates rear surface image data for generating a rear surface image shrunk in accordance with a shrink ratio of recording media that occurs when forming a front surface image, and adds a blank area to the rear surface image data so that an image size of shrunk rear surface image data and an image size of front surface image data are the same.

In an ink-jet type printing apparatus, when ink ejected from the print section attaches to the print base material, the print base material is extended by the ink attached thereto. Thus, in the ink-jet type color printing apparatus, attaching positions of the ink may deviate among the plurality of colors, and the print positions may deviate among the plurality of colors.

FIG. 16 is a diagram showing a deviation of the print position in a conventional color printing apparatus. In FIG. 16, it is assumed that a left-to-right direction is the transport direction and a top-to-bottom direction is the width direction. A line segment with a reference symbol L1 schematically represents a print position by black ink ejected from a print section provided in an upstream side in the transport direction, and a line segment with a reference symbol L2 schematically represents a print position by cyan ink ejected from a print section provided in a downstream side in the transport direction. Ideally, it is assumed that the print position of the line segment L1 and the print position of the line segment L2 are the same. However, in this example, the print position of the cyan line segment L2 deviates from the print position of the black line segment L1 by $\Delta t1$ in the transport direction and by $\Delta t2$ in the width direction. In order to reduce the deviation amounts $\Delta t1$, $\Delta t2$, many printing apparatuses perform processing such as controlling print timing for each print section.

However, in the conventional printing apparatus, the deviation of the print position that occurs when the plurality of print sections is used cannot be fully prevented.

SUMMARY OF THE INVENTION

Therefore, an object of the present invention is to provide a printing apparatus capable of preventing a deviation of a print position that occurs when a plurality of print sections is used.

According to a first aspect of the present invention, there is provided a printing apparatus including: a transport section configured to transport a continuous print base material in a predetermined transport direction; a first print section configured to eject first ink to the print base material based on first print data; a second print section provided in a downstream side of the first print section in the transport direction and configured to eject second ink to the print base material based on second print data; an ink amount estimating section configured to estimate an amount of ink ejected to the print base material from before printing by the first print section to before printing by the second print section, based on print data including the first print data; a deviation amount obtaining section configured to obtain a deviation amount between a print position by the first print section and a print position by the second print section at least based on the ink amount estimated by the ink amount estimating section; and a print control section configured to control the print position by the second print section based on the deviation amount.

According to a second aspect of the present invention, in the first aspect of the present invention, the printing apparatus further includes a tension detecting section configured to detect tension applied to the print base material that is being transported by the transport section, and the deviation amount obtaining section obtains the deviation amount at least based on the ink amount and the tension.

According to a third aspect of the present invention, in the first aspect of the present invention, the deviation amount obtaining section includes a calculator learned by machine learning and configured to output the deviation amount using at least the ink amount as an input.

According to a fourth aspect of the present invention, in the first aspect of the present invention, the deviation amount obtaining section includes a calculator learned by machine learning and configured to use at least the ink amount as an input, and obtains the deviation amount based on an output of the calculator.

According to a fifth aspect of the present invention, in the second aspect of the present invention, the deviation amount obtaining section includes a calculator learned by machine learning and configured to output the deviation amount using at least the ink amount and the tension as inputs.

According to a sixth aspect of the present invention, in the second aspect of the present invention, the deviation amount obtaining section includes a calculator learned by machine learning and configured to use at least the ink amount and the tension as inputs, and obtains the deviation amount based on an output of the calculator.

According to a seventh aspect of the present invention, in the second aspect of the present invention, the printing apparatus further includes a data supply section configured to supply data having a correlation with the deviation amount, and the deviation amount obtaining section obtains the deviation amount based on the ink amount, the tension, and the data.

According to an eighth aspect of the present invention, in the seventh aspect of the present invention, the deviation amount obtaining section includes a calculator learned by machine learning and configured to output the deviation amount using the ink amount, the tension, and the data as inputs.

According to a ninth aspect of the present invention, in the seventh aspect of the present invention, the deviation amount obtaining section includes a calculator learned by machine learning and configured to use the ink amount, the tension, and a part of the data as inputs, and obtains the deviation amount based on an output of the calculator and a remaining part of the data.

According to a tenth aspect of the present invention, in the seventh aspect of the present invention, the data include at least one of a weight of the print base material per unit area, a transport speed of the print base material, an ambient temperature of the print base material, an ambient humidity of the print base material, an edge position of the print base material, a position of the print base material in a direction perpendicular to a surface, a distance in the transport direction between the first print section and the second print section, a distance between a print head included in the second print section and the print base material, and a characteristic of the ink.

According to an eleventh aspect of the present invention, in the third aspect of the present invention, the printing apparatus further includes: a test data storage section configured to store test data; an image capturing section configured to capture a test printed matter obtained by printing on the print base material using the test data; and a deviation amount measuring section configured to measure a deviation amount in the test printed matter based on an image captured by the image capturing section, and the calculator is learned by machine learning at least using the ink amount estimated based on the test data and the deviation amount measured by the deviation amount measuring section.

According to a twelfth aspect of the present invention, in the first aspect of the present invention, the second print section includes a plurality of print heads lined up in a width direction of the print base material, the ink amount estimating section estimates the ink amount with respect to each of a plurality of areas obtained by dividing the print base material in the width direction corresponding to the plurality of print heads, the deviation amount obtaining section obtains the deviation amount with respect to each of the plurality of areas, and the print control section individually controls print positions by the plurality of print heads based on the deviation amount.

According to a thirteenth aspect of the present invention, in the twelfth aspect of the present invention, the print control section individually controls print timings of the plurality of print heads based on a deviation amount in the transport direction included in the deviation amount.

According to a fourteenth aspect of the present invention, in the twelfth aspect of the present invention, the print control section individually controls the print positions by the plurality of print heads in the width direction based on a deviation amount in the width direction included in the deviation amount.

According to a fifteenth aspect of the present invention, in the first aspect of the present invention, the printing apparatus further includes an image resizing section configured to resize an image represented by the second print data in a width direction, based on a deviation amount of the print base material in the width direction included in the deviation amount.

According to a sixteenth aspect of the present invention, in the first aspect of the present invention, the first ink is ink for printing a first color component image constituting one color image, and the second ink is ink for printing a second color component image constituting the color image.

According to a seventeenth aspect of the present invention, there is provided a learning device learned about an extension amount of a continuous print base material in a printing apparatus that ejects ink from a print head to the print base material, and the learning device is learned by machine learning using learning data in which at least an amount of ink ejected from the print head to the print base material and tension applied to the print base material are feature values and the extension amount of the print base material is an objective variable.

According to an eighteenth aspect of the present invention, in the seventeenth aspect of the present invention, the learning device is learned by machine learning using the learning data further including, as a feature value, at least one of a weight of the print base material per unit area, a transport speed of the print base material, an ambient temperature of the print base material, an ambient humidity of the print base material, an edge position of the print base material, a position of the print base material in a direction perpendicular to a surface, a distance between the print head and the print base material, and a characteristic of the ink.

According to a nineteenth aspect of the present invention, there is provided a printing apparatus including: a transport section configured to transport a continuous print base material in a predetermined transport direction; a first print section configured to eject first ink to the print base material based on first print data; a second print section provided in a downstream side of the first print section in the transport direction and configured to eject second ink to the print base material based on the second print data; an ink amount estimating section configured to estimate an amount of ink ejected to the print base material from before printing by the first print section to before printing by the second print section, based on print data including the first print data; a tension detecting section configured to detect tension applied to the print base material that is being transported by the transport section; an extension amount obtaining section including the learning device according to the seventeenth aspect of the present invention and configured to provide the learning device with at least the ink amount estimated by the ink amount estimating section and the tension detected by the tension detecting section to obtain the extension amount of the print base material; and a print control section configured to control a print position by the second print section based on the extension amount.

According to the first aspect, by estimating the amount of ink ejected to the print base material from before printing by the first print section to before printing by the second print section, obtaining the deviation amount between the print position by the first print section and the print position by the second print section at least based on the estimated ink amount, and controlling the print position by the second print section based on the obtained deviation amount, the print position by the first print section and the print position by the second print section can be matched, and a deviation of a print position that occurs when a plurality of print sections is used can be prevented.

According to the second aspect, by obtaining the deviation amount at least based on the estimated ink amount and the detected tension, and controlling the print position by the second print section based on the obtained deviation amount, the print position by the first print section and the print position by the second print section can be matched, and the deviation of the print position that occurs when the plurality of print sections is used can be prevented.

According to the third or fourth aspect, even when it is difficult to represent a relationship between the ink amount and the deviation amount using a formula or the like, the deviation amount can be obtained with high accuracy based on the ink amount using the calculator learned by machine learning.

According to the fifth or sixth aspect, even when it is difficult to represent a relationship between the deviation amount and the ink amount or the tension using a formula or the like, the deviation amount can be obtained with high accuracy based on the ink amount and the tension using the calculator learned by machine learning.

According to the seventh aspect, by obtaining the deviation amount based on the estimated ink amount, the detected tension, and the data having the correlation with the deviation amount, and controlling the print position by the second print section based on the obtained deviation amount, the print position by the first print section and the print position by the second print section can be matched, and the deviation of the print position that occurs when the plurality of print sections is used can be prevented.

According to the eighth or ninth aspect, even when it is difficult to represent a relationship between the deviation amount and the ink amount, the tension, or the data having the correlation with the deviation amount using a formula or the like, the deviation amount can be obtained with high accuracy based on the ink amount, the tension, and the data having the correlation with the deviation amount using the calculator learned by machine learning.

According to the tenth aspect, by obtaining the deviation amount based on, in addition to the ink amount and the tension, the weight of the print base material per unit area, the transport speed of the print base material, the ambient temperature of the print base material, the ambient humidity of the print base material, the edge position of the print base material, the position of the print base material in the direction perpendicular to the surface, the distance in the transport direction between the print sections, the distance between the print head included in the second print section and the print base material, the characteristic of the ink, or the like, and controlling the print position by the second print section based on the obtained deviation amount, the print position by the first print section and the print position by the second print section can be matched, and the deviation of the print position that occurs when the plurality of print sections is used can be prevented effectively.

According to the eleventh aspect, machine learning of the calculator can be performed using the test data storage section, the image capturing section, and the deviation amount measuring section, and the deviation amount can be obtained with high accuracy based on the ink amount and the like using the learned calculator.

According to the twelfth aspect, by estimating the ink amount with respect to each of the plurality of areas obtained by dividing the print base material in the width direction to obtain the deviation amount, and individually controlling the print positions by the plurality of print heads based on the obtained deviation amount, the print position by the first print section and the print position by the second print section can be matched, and the deviation of the print position that occurs when the plurality of print sections is used can be prevented effectively.

According to the thirteenth aspect, by individually controlling the print timings of the plurality of print heads based on the obtained deviation amount in the transport direction, the deviation of the print position in the transport direction that occurs when the plurality of print sections is used can be prevented easily.

According to the fourteenth aspect, by individually controlling the print positions by the plurality of print heads in the width direction based on the obtained deviation amount in the width direction, the deviation of the print position in the width direction that occurs when the plurality of print sections is used can be prevented.

According to the fifteenth aspect, by controlling a size in the width direction of the image represented by the second print data, based on the obtained deviation amount in the width direction, even when the second print section does not have a function of controlling the print position in the width direction, the deviation of the print position in the width direction that occurs when the plurality of print sections is used can be prevented.

According to the sixteenth aspect, in a color printing apparatus having a plurality of print sections, the deviation of the print position can be prevented among a plurality of colors.

According to the seventeenth aspect, even when it is difficult to represent a relationship between the extension amount of the print base material and the ink amount or the tension using a formula or the like, the extension amount can be obtained based on the ink amount and the tension using the calculator learned by machine learning using the learning data in which at least the ink amount and the tension are the feature values and the extension amount is the objective variable.

According to the eighteenth aspect, even when it is difficult to represent a relationship between the extension amount of the print base material and the ink amount, the tension, or other data using a formula or the like, the extension amount can be obtained based on the ink amount, the tension, and the other data using the calculator learned by machine learning using the learning data in which the ink amount, the tension, and the other data are the feature values and the extension amount is the objective variable.

According to the nineteenth aspect, by obtaining the extension amount of the print base material at least based on the ink amount and the tension using the learned calculator, and controlling the print position by the second print section based on the obtained extension amount, the print position by the first print section and the print position by the second print section can be matched, and the deviation of the print position that occurs when the plurality of print sections is used can be prevented.

These and other objects, features, modes and effects of the present invention will be more apparent from the following detailed description with reference to the attached drawings.

DETAILED DESCRIPTION OF THE INVENTION

First Embodiment

Figure 1:
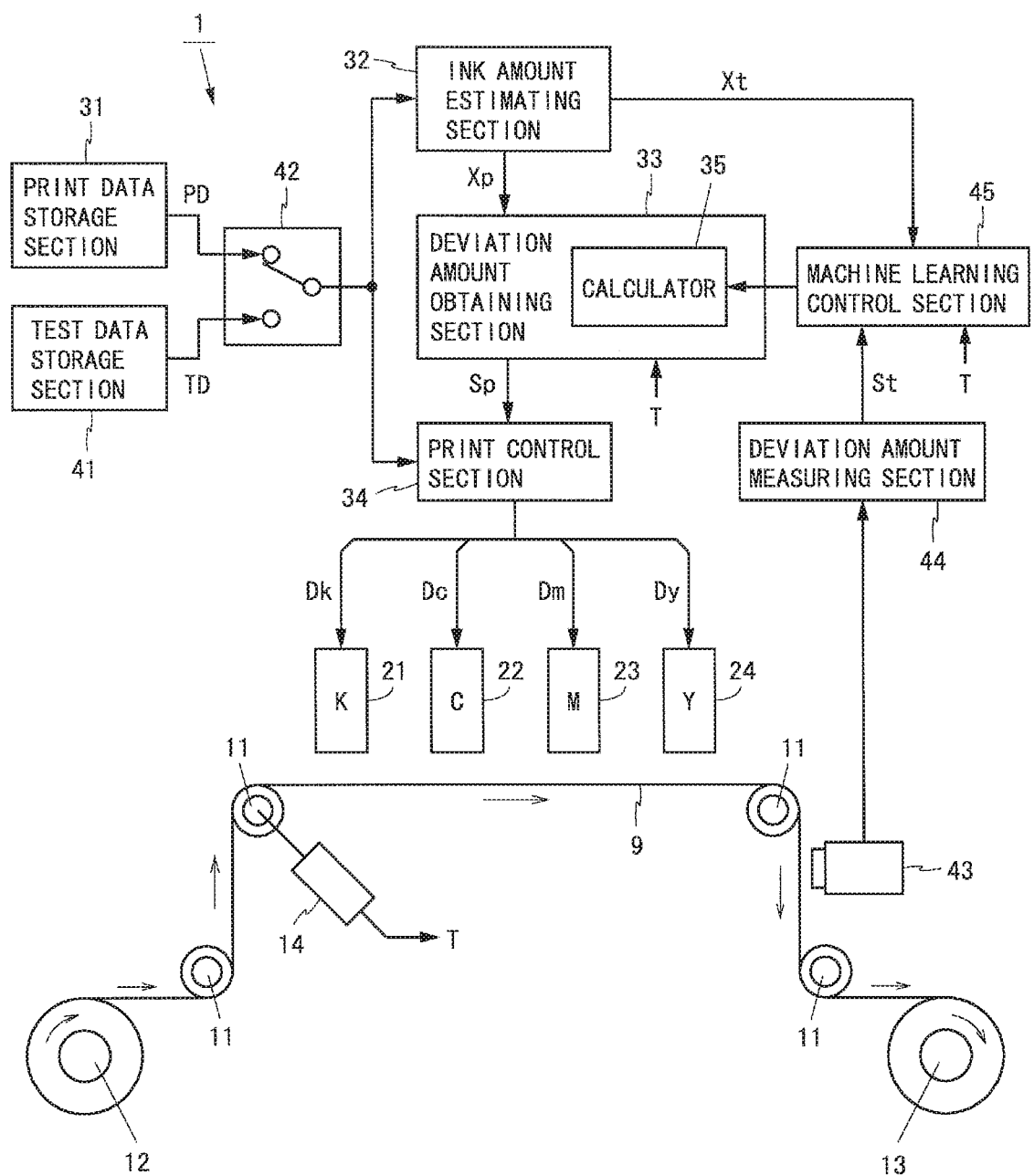
FIG. 1 is a block diagram showing a configuration of a printing apparatus according to a first embodiment of the present invention.

FIG. 1 is a block diagram showing a configuration of a printing apparatus according to a first embodiment of the present invention. A printing apparatus 1 shown in FIG. 1 includes a transport section including a plurality of rollers 11 and the like, a tension detecting section 14, four print sections 21 to 24, a print data storage section 31, an ink amount estimating section 32, a deviation amount obtaining section 33 including a calculator 35 capable of performing machine learning, and a print control section 34. In order to make the calculator 35 perform machine learning, the printing apparatus 1 further includes a test data storage section 41, a data selecting section 42, an image capturing section 43, a deviation amount measuring section 44, and a machine learning control section 45. The printing apparatus 1 is an ink-jet type color printing apparatus that transports a continuous printing paper 9 using the transport section and ejects ink of four colors different from each other in turn from the four print sections 21 to 24 to the printing paper 9 that is being transported.

The printing paper 9 is one kind of a print base material. The transport section includes the plurality of rollers 11, an unwinding roller 12, and a winding roller 13. The printing paper 9 before printing is wound around the unwinding roller 12. The transport section transports the printing paper 9 in a predetermined direction (left-to-right direction in the drawings) using the plurality of rollers 11. Each of the print sections 21 to 24 ejects ink of a specific color to the printing paper 9 that is being transported using the transport section. The printing paper 9 after printing is wound around the winding roller 13. In the following, a longitudinal direction of the printing paper 9 is referred to as a transport direction, a lateral direction of the printing paper 9 is referred to as a width direction, and a direction perpendicular to a surface of the printing paper 9 is referred to as a vertical direction.

The print sections 21 to 24 are provided along the transport direction of the printing paper 9 in an ascending order of reference symbols. The print section 22 is provided in a downstream side of the print section 21 in the transport direction. The print section 23 is provided in the downstream side of the print sections 21, 22 in the transport direction. The print section 24 is provided in the downstream side of the print sections 21 to 23 in the transport direction. The print control section 34 outputs black image data Dk, cyan image data Dc, magenta image data Dm, and yellow image data Dy to the print sections 21 to 24, respectively.

The print section 21 ejects black ink to the printing paper 9 based on the black image data Dk. The print section 22 ejects cyan ink to the printing paper 9 based on the cyan image data Dc. The print section 23 ejects magenta ink to the printing paper 9 based on the magenta image data Dm. The print section 24 ejects yellow ink to the printing paper 9 based on the yellow image data Dy. In this manner, the print sections 21 to 24 eject the black, cyan, magenta, and yellow ink in turn to the printing paper 9 that is being transported by the transport section. With this, a black image, a cyan image, a magenta image, and a yellow image are formed in turn on the printing paper 9 so as to overlap with each other, and color printing is performed.

The print data storage section 31 stores print data PD used for printing. The test data storage section 41 stores test data TD used for test printing. Among the components of the printing apparatus 1, the print data storage section 31, the ink amount estimating section 32, the deviation amount obtaining section 33, the print control section 34, the test data storage section 41, the data selecting section 42, the deviation amount measuring section 44, and the machine learning control section 45 are typically configured using a computer.

Figure 2:
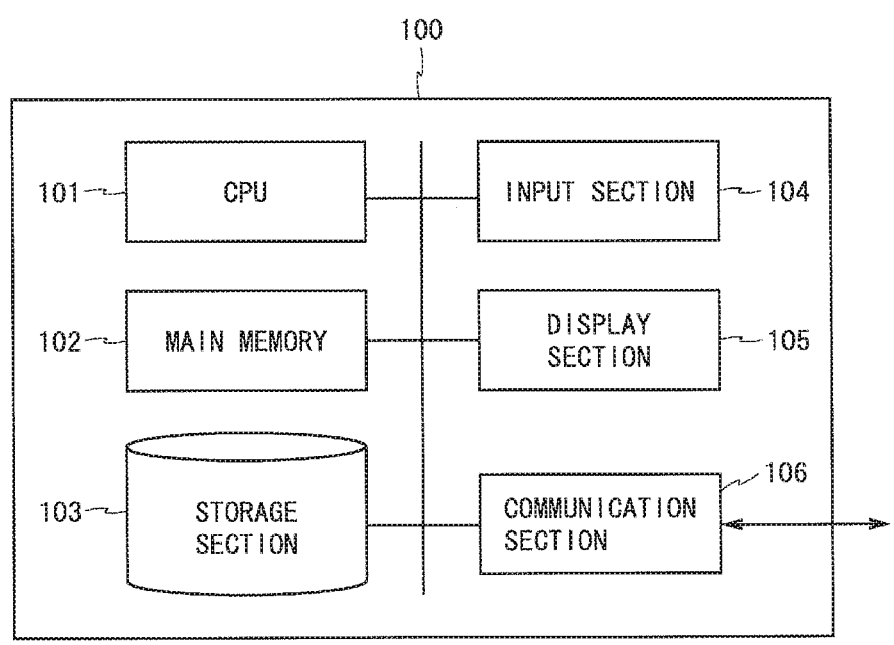
FIG. 2 is a block diagram showing a configuration of a computer that functions as a part of the printing apparatus shown in FIG. 1.

FIG. 2 is a block diagram showing a configuration of a computer that functions as a part of the printing apparatus 1. A computer 100 shown in FIG. 2 includes a CPU 101, a main memory 102, a storage section 103, an input section 104, a display section 105, and a communication section 106. A DRAM is used as the main memory 102, for example. A hard disk is used as the storage section 103, for example. A touch panel is used as the input section 104, for example. A liquid crystal display is used as the display section 105, for example. An interface circuit of a wired communication or a radio communication is used as the communication section 106, for example.

The storage section 103 stores the print data PD and the test data TD, and functions as the print data storage section 31 and the test data storage section 41. Furthermore, the storage section 103 stores a control program of the printing apparatus 1. The test data TD and the control program are stored in the storage section 103 in advance, for example. The print data PD is received from another computer using the communication section 106, for example.

When the control program is to be executed, the control program and the print data PD (or the test data TD) are copied and transferred to the main memory 102. The CPU 101 executes the control program stored in the main memory 102 using the main memory 102 as a work memory. At this time, the computer 100 functions as the ink amount estimating section 32, the deviation amount obtaining section 33, the print control section 34, the data selecting section 42, the deviation amount measuring section 44, and the machine learning control section 45. Note that the above-described configuration of the computer 100 is merely an example, and a part of the printing apparatus 1 can be configured using an arbitrary computer.

Figure 3:
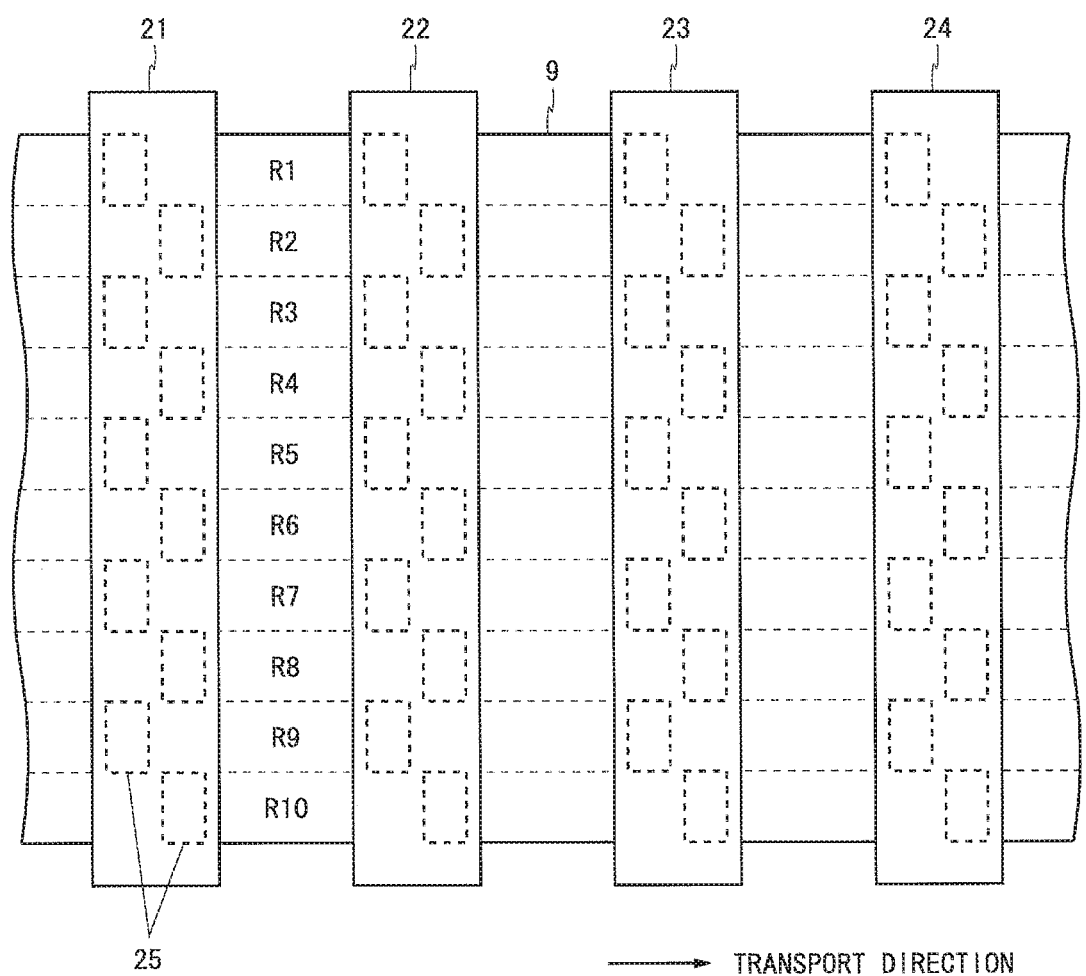
FIG. 3 is a schematic diagram showing a configuration of a print section of the printing apparatus shown in FIG. 1.

FIG. 3 is a schematic diagram showing a configuration of the print sections 21 to 24. FIG. 3 describes the print sections 21 to 24 seen from the top. As shown in FIG. 3, each of the print sections 21 to 24 includes a plurality of print heads 25. The plurality of print heads 25 is arranged in a staggered manner along the width direction of the printing paper 9 so as to form two lines. Note that the plurality of print heads 25 may be arranged along the width direction of the printing paper 9 so as to form one line. The numbers of the print heads 25 included in the print sections 21 to 24 are the same. The printing paper 9 is divided into a plurality of areas in the width direction corresponding to the plurality of print heads 25 included in one print section. In the following, it is assumed that each of the print sections 21 to 24 includes ten print heads 25 and the printing paper 9 is divided into ten areas R1 to R10 in the width direction corresponding to the ten print heads 25.

As described above, the print data storage section 31 stores the print data PD, and the test data storage section 41 stores the test data TD. During normal operation, the data selecting section 42 selects the print data PD from the print data PD and the test data TD. The selected print data PD is supplied to the ink amount estimating section 32 and the print control section 34.

The print control section 34 outputs the black image data Dk, the cyan image data Dc, the magenta image data Dm, and the yellow image data Dy included in the print data PD to the print sections 21 to 24, respectively. Based on the black image data Dk, the cyan image data Dc, the magenta image data Dm, and the yellow image data Dy, the print sections 21 to 24 respectively eject the black, cyan, magenta, and yellow ink in turn to the printing paper 9 that is being transported. With this, the black image, the cyan image, the magenta image, and the yellow image are formed in turn on the printing paper 9 so as to overlap with each other, and color printing based on the print data PD is performed.

The ink amount estimating section 32 estimates an amount of ink ejected to the printing paper 9 from before printing by a certain print section to before printing by another print section with respect to each of the areas R1 to R10, based on the black image data Dk, the cyan image data Dc, and the magenta image data Dm included in the print data PD.

More Specifically, the ink amount estimating section 32 estimates an amount of the black ink ejected to the printing paper 9 with respect to each area, based on the black image data Dk required for a predetermined amount of printing (for example, printing of one page). The ink amount estimating section 32 estimates the amount of the black ink by obtaining a total sum of amounts of the black ink corresponding to a plurality pieces of pixel data included in the black image data Dk. Similarly, the ink amount estimating section 32 estimates an amount of the cyan ink and an amount of the magenta ink ejected to the printing paper 9 with respect to each area, based on the cyan image data Dc and the magenta image data Dm required for the predetermined amount of printing.

With respect to each area, the ink amount estimating section 32 regards the estimated amount of the black ink as an amount of ink ejected to the printing paper 9 from before printing by the print section 21 to before printing by the print section 22 (hereinafter referred to as K ink amount). With respect to each area, the ink amount estimating section 32 regards a sum of the estimated amounts of the black ink and the cyan ink as an amount of ink ejected to the printing paper 9 from before printing by the print section 21 to before printing by the print section 23 (hereinafter referred to as KC ink amount). With respect to each area, the ink amount estimating section 32 regards a sum of the estimated amounts of the black ink, the cyan ink, and the magenta ink as an amount of ink ejected to the printing paper 9 from before printing by the print section 21 to before printing by the print section 24 (hereinafter referred to as KCM ink amount). The ink amount estimating section 32 outputs the K ink amount, the KC ink amount, and the KCM ink amount estimated with respect to each of the areas R1 to R10, as an ink amount Xp.

Note that the ink amount estimating section 32 may estimate, by a similar method, an amount of ink ejected to the printing paper 9 from before printing by the print section 22 to before printing by the print section 23, an amount of ink ejected to the printing paper 9 from before printing by the print section 22 to before printing by the print section 24, and an amount of ink ejected to the printing paper 9 from before printing by the print section 23 to before printing by the print section 24. The ink amount estimating section 32 may estimate the ink amount Xp based on three color image data Dk, Dc, Dm, with respect to the areas R1 to R10 by a method easier than the above-described method.

Figure 4A:
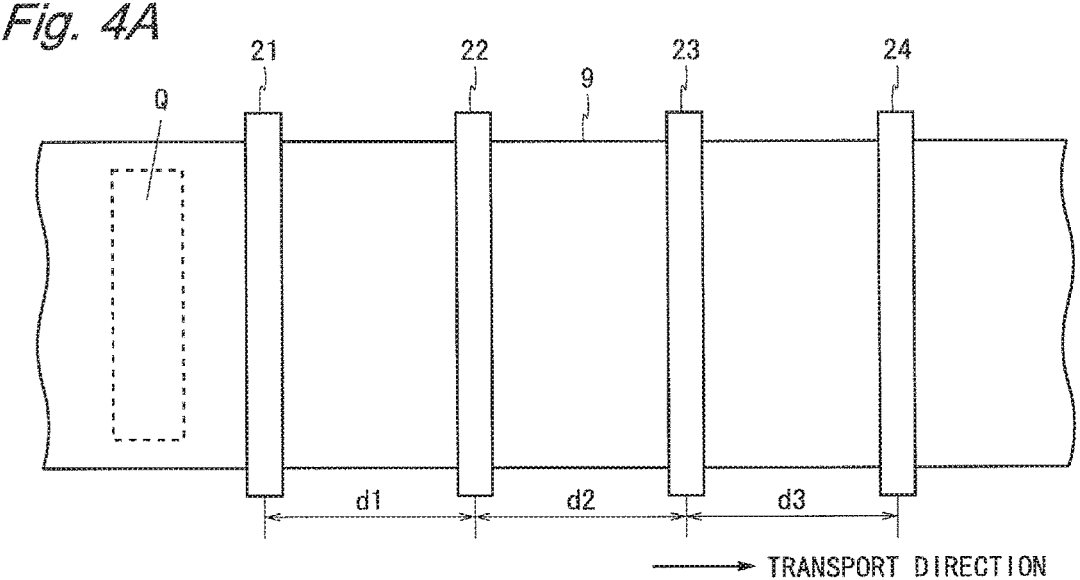
FIG. 4A is a diagram showing a state before printing in the printing apparatus shown in FIG. 1.
Figure 4B:
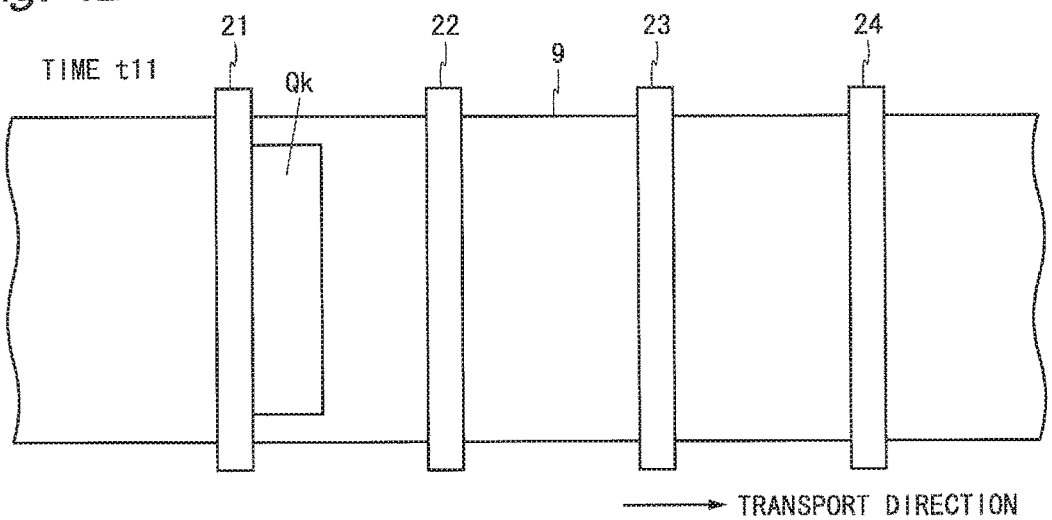
FIG. 4B is a diagram showing a state after printing a black image in the printing apparatus shown in FIG. 1.
Figure 4C:
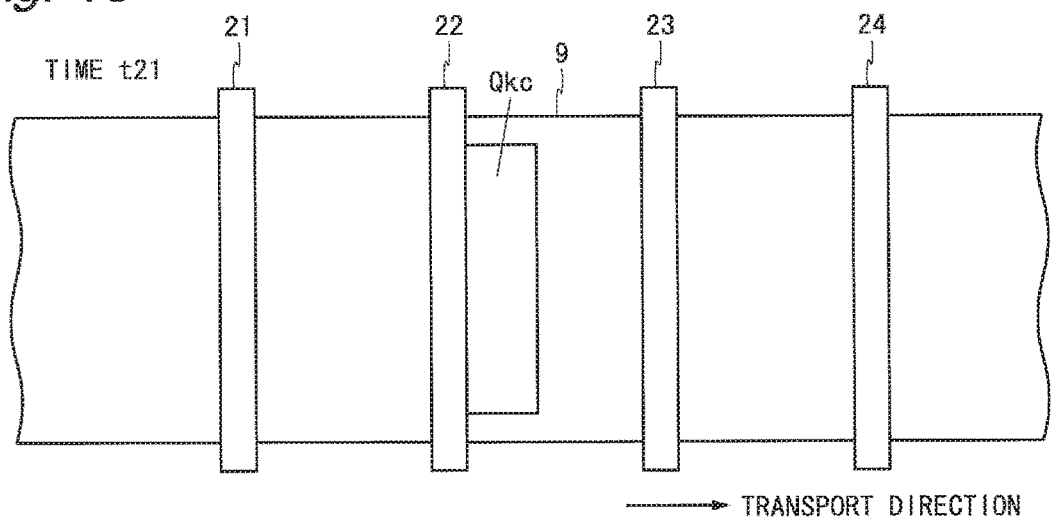
FIG. 4C is a diagram showing a state after printing a cyan image in the printing apparatus shown in FIG. 1.
Figure 4D:
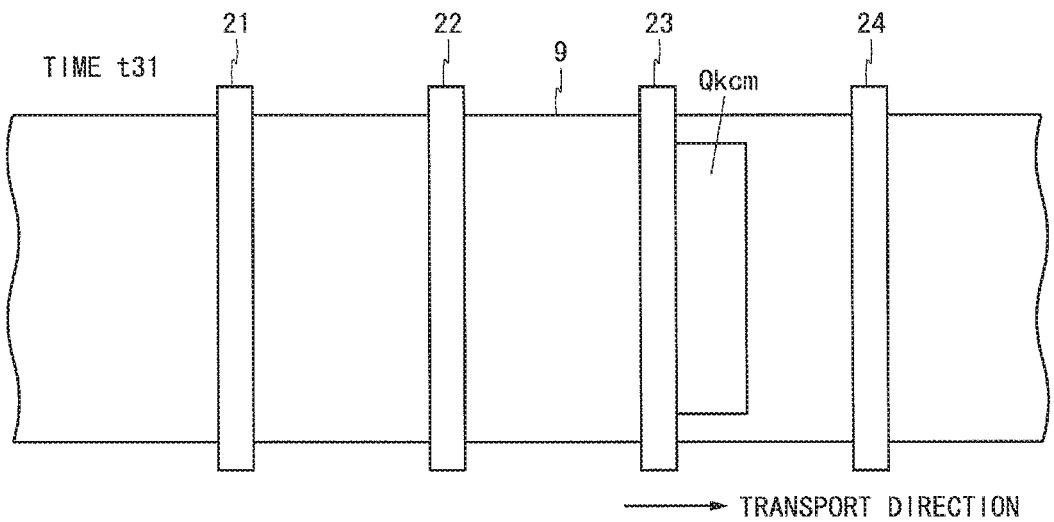
FIG. 4D is a diagram showing a state after printing a magenta image in the printing apparatus shown in FIG. 1.
Figure 4E:
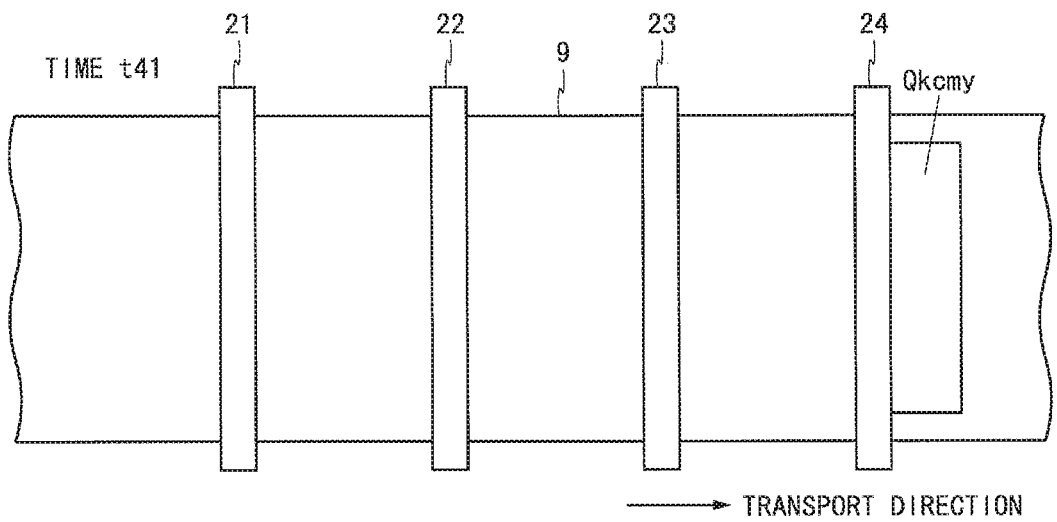
FIG. 4E is a diagram showing a state after printing a yellow image in the printing apparatus shown in FIG. 1.

Referring to FIGS. 4A to 4E, the reason why the ink amount estimating section 32 estimates the K ink amount, the KC ink amount, and the KCM ink amount will be described. FIG. 4A is a diagram showing a state before printing. FIGS. 4B to 4E are diagrams showing states after printing the black image, the cyan image, the magenta image, and the yellow image, respectively. FIG. 4A to 4E schematically describe the printing paper 9 seen from the top and describe a manner in which color printing is performed with a passage of time. Note that although the printing paper 9 is extended in the transport direction and the width direction when ink is attached to the printing paper 9, an attention is paid to an extension in the transport direction of the printing paper 9 here for ease of explanation.

As shown in FIG. 4A, it is assumed that a distance in the transport direction between the print sections 21, 22 is d1, a distance in the transport direction between the print sections 22, 23 is d2, and a distance in the transport direction between the print sections 23, 24 is d3. It is assumed that times when a right edge of an area Q shown with a dashed line in FIG. 4A reaches the print sections 21 to 24 are t10, t20, t30, and t40, respectively, and times when a left edge of the area Q leaves the print sections 21 to 24 are t1, t21, t31, and t41, respectively. FIGS. 4B to 4E describe states of the printing paper 9 at the times t11, t21, t31, and t41, respectively.

In a period from the time t10 to the time t1, the print section 21 ejects the black ink to the printing paper 9. The print control section 34 controls an ejection start timing and an ejection end timing of the black ink in the print section 21. At the time t11 (FIG. 4B), a black image Qk is printed in the area Q.

Next, in a period from the time t20 to the time t21, the print section 22 ejects the cyan ink to the printing paper 9. The print control section 34 controls an ejection start timing and an ejection end timing of the cyan ink in the print section 22. At the time t21 (FIG. 4C), a two color image Qkc obtained by overlapping the black image and the cyan image is printed in the area Q.

The distance d1 in the transport direction between the print sections 21, 22 and a transport speed of the printing paper 9 are already known. Thus, by controlling the print start time t20 of the cyan image or a delay time (t20−t10) from a print start of the black image to a print start of the cyan image, the cyan image is slated to be printed at the same position as the black image. However, at the print start time t20 of the cyan image, the printing paper 9 is extended by the black ink ejected to the printing paper 9 so far. The larger the amount of ink ejected from the print section 21 is, the larger an extension amount of the printing paper 9 at the time t20 is. Thus, if the print start time t20 or the delay time (t20−t10) is controlled without considering the ink amount, a deviation may occur between a print position of the black image and a print position of the cyan image.

Therefore, when obtaining the print start time t20 of a second color image (cyan image) or the delay time (t20−t10) from a print start of a first color image (black image) to a print start of the second color image, the printing apparatus 1 uses the amount of amount (K ink amount) used for printing the first color image. With this, as described later, the deviation between the print position of the black image and the print position of the cyan image can be prevented.

Next, in a period from the time t30 to the time t31, the print section 23 ejects the magenta ink to the printing paper 9. The print control section 34 controls an ejection start timing and an ejection end timing of the magenta ink in the print section 23. At the time t31 (FIG. 4D), a three color image Qkcm obtained by overlapping the black image, the cyan image, and the magenta image is printed in the area Q.

A distance (d1+d2) in the transport direction between the print sections 21, 23 and the transport speed of the printing paper 9 are already known. Thus, by controlling the print start time t30 of the magenta image or a delay time (t30−t10) from the print start of the black image to a print start of the magenta image, the magenta image is slated to be printed at the same position as the black image. However, at the print start time t30 of the magenta image, the printing paper 9 is extended by the black ink and the cyan ink ejected to the printing paper 9 so far. The larger a total amount of the ink ejected from the print sections 21, 22 is, the larger an extension amount of the printing paper 9 at the time t30 is.

Therefore, when obtaining the print start time t30 of a third color image (magenta image) or the delay time (t30−t10) from the print start of the first color image to a print start of the third color image, the printing apparatus 1 uses a total amount of ink (KC ink amount) used for printing the first color and second color images. With this, as described later, a deviation between the print position of the black image and a print position of the magenta image can be prevented.

Next, in a period from the time t40 to the time t41, the print section 24 ejects the yellow ink to the printing paper 9. The print control section 34 controls an ejection start timing and an ejection end timing of the yellow ink in the print section 24. At the time t41 (FIG. 4E), a four color image Qkcmy obtained by overlapping the black image, the cyan image, the magenta image, and the yellow image is printed in the area Q.

A distance (d1+d2+d3) in the transport direction between the print sections 21, 24 and the transport speed of the printing paper 9 are already known. Thus, by controlling the print start time t40 of the yellow image or a delay time (t40−t10) from the print start of the black image to a print start of the yellow image, the yellow image is slated to be printed at the same position as the black image. However, at the print start time t40 of the yellow image, the printing paper 9 is extended by the black ink, the cyan ink, and the yellow ink ejected to the printing paper 9 so far. The larger a total amount of the ink ejected from the print sections 21 to 23, the larger an extension amount of the printing paper 9 at the time t40 is.

Therefore, when obtaining the print start time t40 of a fourth color image (yellow image) or the delay time (t40−t10) from the print start of the first color image to a print start of the fourth color image, the printing apparatus 1 uses a total amount of ink (KCM ink amount) used for printing the first color to third color images. With this, as described later, a deviation between the print position of the black image and a print position of the yellow image can be prevented.

In this manner, the printing apparatus 1 obtains, with respect to each of the second or later color images, a print start time of the image or a delay time from the print start of the first color image to a print start of the image, using an amount of ink used for printing at least one image printed before the image. By controlling a corresponding print section based on the obtained ink amount, a deviation between a print position of the first color image and a print position of the image can be prevented. By performing the above-described processing with respect to all of second or later color component images, deviations between the print positions among a plurality of color component images constituting one color image can be prevented.

The tension detecting section 14 is attached to an axis of a certain roller 11 included in the transport section. The tension detecting section 14 detects tension T applied to the printing paper 9 that is being transported by the transport section. The ink amount Xp estimated by the ink amount estimating section 32 and the tension T detected by the tension detecting section 14 are input to the deviation amount obtaining section 33.

Figure 5:
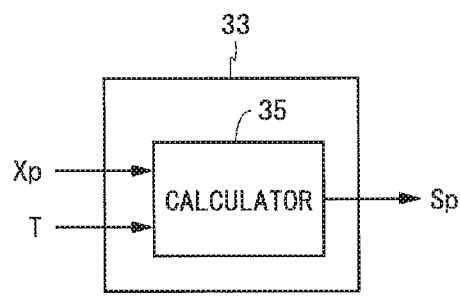
FIG. 5 is a block diagram showing a configuration of a deviation amount obtaining section of the printing apparatus shown in FIG. 1.

FIG. 5 is a block diagram showing a configuration of the deviation amount obtaining section 33. As shown in FIG. 5, the ink amount Xp and the tension T that are input to the deviation amount obtaining section 33 are input to the calculator 35. More specifically, with respect to each of the areas R1 to R10, the K ink amount, the KC ink amount, and the KCM ink amount are input in turn to the calculator 35 together with the tension T.

The calculator 35 is learned by machine learning so as to output a deviation amount of the print position using the ink amount and the tension as inputs. The calculator 35 is a learning device learned by machine learning using learning data in which the ink amount and the tension are feature values and the deviation amount of the print position is an objective variable. When the ink amount Xp obtained by the ink amount estimating section 32 (one of the K ink amount, the KC ink amount, and the KCM ink amount) and the tension T are input to the calculator 35, the calculator 35 outputs the deviation amount.

More specifically, when the K ink amount related to the area R1 and the tension T are input to the calculator 35, the calculator 35 outputs a deviation amount between a print position of the print section 21 and a print position of the print section 22 in the area R1. When the KC ink amount related to the area R1 and the tension T are input to the calculator 35, the calculator 35 outputs a deviation amount between the print position of the print section 21 and a print position of the print section 23 in the area R1. When the KCM ink amount related to the area R1 and the tension T are input to the calculator 35, the calculator 35 outputs a deviation amount between the print position of the print section 21 and a print position of the print section 24 in the area R1. The calculator 35 performs similar operations on the ink amounts related to the areas R2 to R10. The deviation amount that are output from the calculator 35 includes a deviation amount in the transport direction and a deviation amount in the width direction. The deviation amount obtaining section 33 outputs an output of the calculator 35 as a deviation amount Sp to the print control section 34.

The deviation amount obtaining section 33 may include only one calculator 35, may include a plurality of calculators 35 corresponding to the plurality of areas, may include a plurality of calculators 35 corresponding to a plurality of colors, or may include a plurality of calculators 35 corresponding to the plurality of areas and the plurality of colors. Furthermore, the calculator 35 may include a neural network having at least one intermediate layer, and may be learned by deep learning.

The print sections 21 to 24 are configured so as to be capable of individually controlling print timings (ink ejection timings) of the plurality of print heads 25. Furthermore, the print sections 21 to 24 are configured so as to be capable of individually controlling print positions by the plurality of print heads 25 in the width direction. For example, the print head 25 is configured to be capable of controlling the print position in the width direction by selecting a nozzle in use (nozzle through which ink is ejected) from among a plurality of nozzles lined up in the width direction in accordance with a given control signal.

The print control section 34 controls the print positions by the print sections 22 to 24 based on the deviation amount Sp obtained by the deviation amount obtaining section 33. The print control section 34 individually controls the print timings of the plurality of print heads 25 included in the print sections 22 to 24 with respect to each of the areas R1 to R10, based on the deviation amount in the transport direction included in the deviation amount Sp obtained by the deviation amount obtaining section 33. More specifically, the print control section 34 controls the print timings of the plurality of print heads 25 included in the print section 21 to the same timing. The print control section 34 individually controls the print timings of the plurality of print heads 25 included in the print section 22 with respect to each area, based on a deviation amount in the transport direction between the print position by the print section 21 and the print position by the print section 22. The print control section 34 individually controls the print timings of the plurality of print heads 25 included in the print section 23 with respect to each area, based on a deviation amount in the transport direction between the print position by the print section 21 and the print position by the print section 23. The print control section 34 individually controls the print timings of the plurality of print heads 25 included in the print section 24 with respect to each area, based on a deviation amount in the transport direction between the print position by the print section 21 and the print position by the print section 24.

For example, when the ink amount estimated by the ink amount estimating section 32 is small, the deviation amount in the transport direction obtained by the deviation amount obtaining section 33 becomes small. In this case, the print control section 34 makes the print timing of the print head 25 included in the print section in the downstream side in the transport direction earlier. On the other hand, when the ink amount estimated by the ink amount estimating section 32 is large, the deviation amount in the transport direction obtained by the deviation amount obtaining section 33 becomes large. In this case, the print control section 34 makes the print timing of the print head 25 included in the print section in the downstream side in the transport direction later. With this, a deviation of a print position in the transport direction between a print section in the upstream side in the transport direction and a print section in the downstream side in the transport direction can be prevented.

Furthermore, the print control section 34 individually controls the print positions in the width direction by the plurality of print heads 25 included in the print sections 22 to 24 with respect to each of the areas R1 to R10, based on the deviation amount in the width direction included in the deviation amount Sp obtained by the deviation amount obtaining section 33. More specifically, the print control section 34 controls the print positions in the width direction of the plurality of print heads 25 included in the print section 21 to the same position. The print control section 34 individually controls the print positions in the width direction of the plurality of print heads 25 included in the print section 22 with respect to each area, based on a deviation amount in the width direction between the print position by the print section 21 and the print position by the print section 22. The print control section 34 individually controls the print positions in the width direction of the plurality of print heads 25 included in the print section 23 with respect to each area, based on a deviation amount in the width direction between the print position by the print section 21 and the print position by the print section 23. The print control section 34 individually controls the print positions in the width direction of the plurality of print heads 25 included in the print section 24 with respect to each area, based on a deviation amount in the width direction between the print position by the print section 21 and the print position by the print section 24. With this, a deviation of the print position in the width direction between the print section in the upstream side in the transport direction and the print section in the downstream side in the transport direction can be prevented, and the deviation of the print position can be prevented among the plurality of colors.

Machine learning of the calculator 35 is performed using the test data storage section 41, the image capturing section 43, the deviation amount measuring section 44, and the machine learning control section 45. Machine learning of the calculator 35 is performed, for example, when the printing apparatus 1 is placed, when the printing paper 9 is exchanged, or the like. When the calculator 35 performs machine learning, the data selecting section 42 selects the test data TD from the print data PD and the test data TD. The selected test data TD is supplied to the ink amount estimating section 32 and the print control section 34.

When the test data TD is supplied, the ink amount estimating section 32 operates in a manner similar to when the print data PD is supplied. The ink amount estimating section 32 estimates the amount of ink ejected to the printing paper 9 from before printing by a certain print section to before printing by another print section, based on the black image data Dk, the cyan image data Dc, and the magenta image data Dm included in the test data TD with respect to each of the areas R1 to R10. An estimated ink amount Xt is output to the machine learning control section 45.

The print control section 34 outputs the black image data Dk, the cyan image data Dc, the magenta image data Dm, and the yellow image data Dy included in the test data TD to the print sections 21 to 24, respectively. Based on the black image data Dk, the cyan image data Dc, the magenta image data Dm, and the yellow image data Dy, the print sections 21 to 24 respectively eject the black, cyan, magenta, and yellow ink in turn to the printing paper 9 that is being transported. With this, test printing based on the test data TD is performed, and a test printed matter is obtained.

The image capturing section 43 is provided in the downstream side of the print sections 21 to 24, and captures the test printed matter (printing paper 9 on which test data TD is printed). The deviation amount measuring section 44 measures a deviation amount St in the test printed matter between a print position by a certain print section and a print position by another print section based on an image captured by the image capturing section 43 (image obtained by capturing the test printed matter). The measured deviation amount St is output to the machine learning control section 45.

When the test data TD is printed, the tension detecting section 14 detects the tension T applied to the printing paper 9 that is being transported by the transport section. The ink amount Xt estimated by the ink amount estimating section 32, the tension T detected by the tension detecting section 14, and the deviation amount St measured by the deviation amount measuring section 44 are input to the machine learning control section 45. The machine learning control section 45 provides the calculator 35 with these data as supervised data, and makes the calculator 35 perform machine learning. The machine learning control section 45 makes the calculator 35 perform machine learning using learning data in which the ink amount Xt and the tension T are feature values and the deviation amount St is an objective variable. With this, the calculator 35 that is learned by machine learning and outputs the deviation amount Sp using the ink amount Xp and the tension T as inputs can be obtained.

Figure 6:
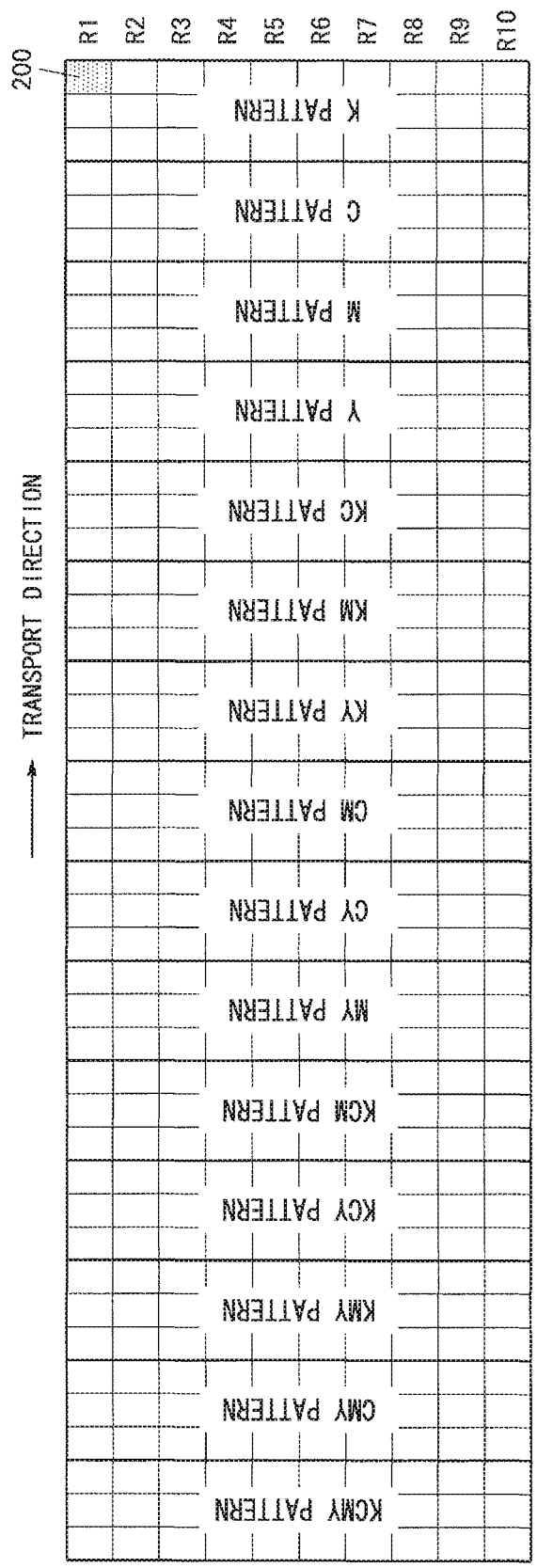
FIG. 6 is a diagram showing an example of test data used in the printing apparatus shown in FIG. 1.

FIG. 6 is a diagram showing an example of the test data used in the printing apparatus 1. In FIG. 6, a rectangle with a dot pattern represents a unit pattern 200 corresponding to one area. The test pattern shown in FIG. 6 includes fifteen patterns in all, such as a K pattern, a KC pattern, a KCM pattern, and a KCMY pattern. Each of the fifteen patterns includes 30 pieces of unit patterns 200.

Figure 7:
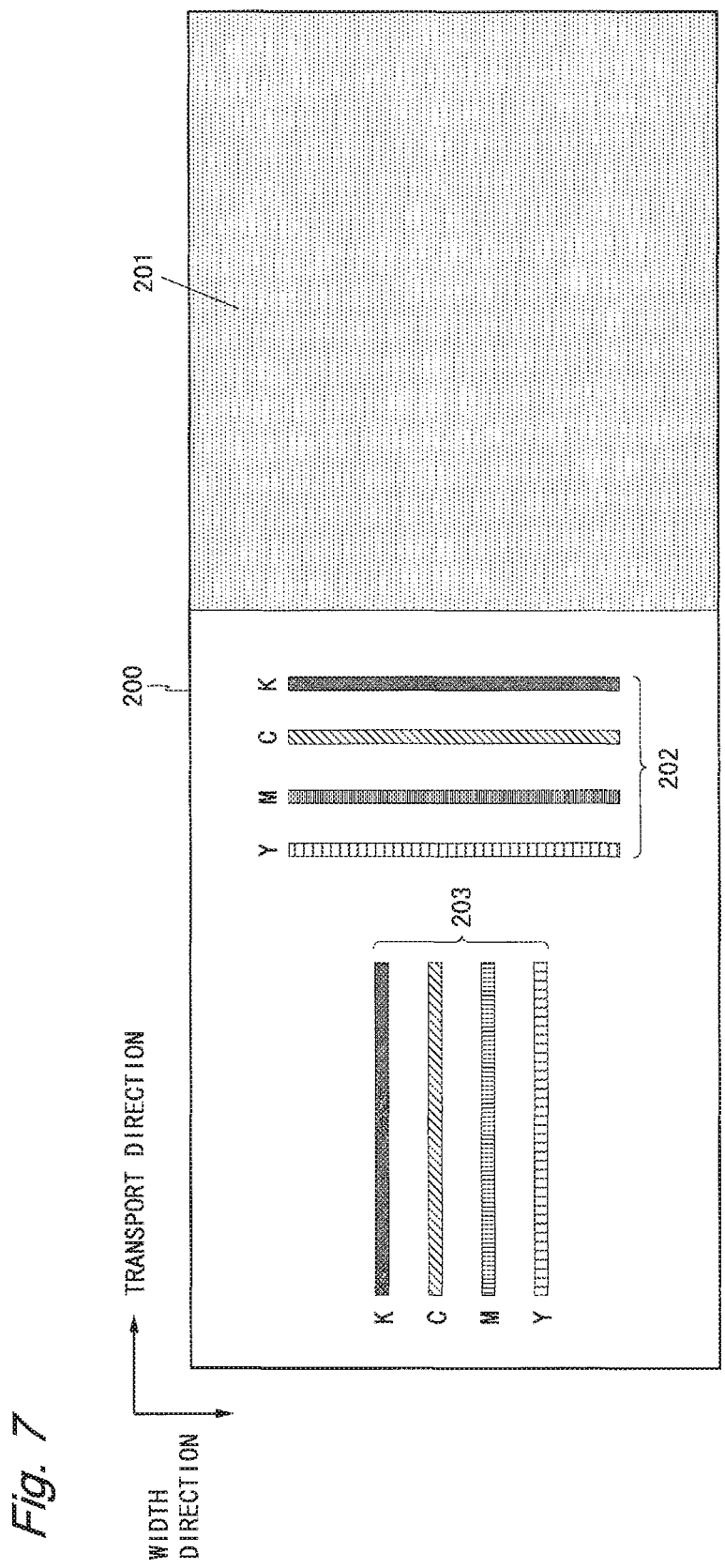
FIG. 7 is a diagram showing details of a unit pattern included in the test data shown in FIG. 6.

FIG. 7 is a diagram showing details of the unit pattern 200. The unit pattern 200 shown in FIG. 7 includes a single color area 201 and two detection patterns 202, 203. The single color area 201 has a color determined for each unit pattern 200. The detection pattern 202 includes black, cyan, magenta, and yellow line segments that are apart by a predetermined distance in the transport direction of the printing paper 9. The detection pattern 203 includes black, cyan, magenta, and yellow line segments that are apart by a predetermined distance in the width direction of the printing paper 9.

The single color area 201 of the unit pattern 200 in the K pattern is an area in which black density is 40%. The single color area 201 of the unit pattern 200 in the KC pattern is an area in which black and cyan densities are 40%. The single color area 201 of the unit pattern 200 in the KCM pattern is an area in which black, cyan, and magenta densities are 40%. The single color area 201 of the unit pattern 200 in the KCMY pattern is an area in which black, cyan, magenta, and yellow densities are 40%. The same holds true for other patterns.

The image capturing section 43 captures the test printed matter on which the test pattern shown in FIG. 6 is printed. The deviation amount measuring section 44 measures the deviation amount St between a print position by a certain print section and a print position by another print section in the test printed matter based on the image obtained by capturing the test printed matter, and outputs the deviation amount St to the machine learning control section 45. Machine learning of the calculator 35 is performed using the measured deviation amount St and the tension T detected by the tension detecting section 14 with respect to the test printed matter. Therefore, even when it is difficult to represent a relationship between the deviation amount Sp and the ink amount Xp or the tension T using a formula or the like, the deviation amount Sp can be obtained with high accuracy based on the ink amount Xp and the tension T using the calculator 35 learned by machine learning.

Note that the printing apparatus 1 may use arbitrary test data other than the test data shown in FIG. 6. As the number of the test data is large, although learning time of the calculator 35 becomes long, an accuracy of the deviation amount Sp obtained using the calculator 35 becomes high. The number of the test data is determined so that the accuracy of the deviation amount Sp obtained using the calculator 35 is higher than a predetermined level.

In the printing apparatus 1, the ink amount estimating section 32 estimates the amount of ink (K ink amount) ejected to the printing paper 9 from before printing by the print section 21 to before printing by the print section 22. The deviation amount obtaining section 33 obtains the deviation amount Sp between the print position by the print section 21 and the print position by the print section 22, based on the estimated K ink amount and the tension T detected by the tension detecting section 14. The print control section 34 controls the print position by the print section 22 based on the obtained deviation amount Sp.

Furthermore, the ink amount estimating section 32 estimates the amount of ink (KC ink amount) ejected to the printing paper 9 from before printing by the print section 21 to before printing by the print section 23. The deviation amount obtaining section 33 obtains the deviation amount Sp between the print position by the print section 21 and the print position by the print section 23 based on the estimated KC ink amount and the tension T. The print control section 34 controls the print position by the print section 23 based on the obtained deviation amount Sp. Furthermore, the ink amount estimating section 32 estimates the amount of ink (KCM ink amount) ejected to the printing paper 9 from before printing by the print section 21 to before printing by the print section 24. The deviation amount obtaining section 33 obtains the deviation amount Sp between the print position by the print section 21 and the print position by the print section 24 based on the estimated KCM ink amount and the tension T. The print control section 34 controls the print position by the print section 24 based on the obtained deviation amount Sp. Therefore, according to the printing apparatus 1, the print position by the print section 21 and the print positions by the print sections 22 to 24 can be matched, and the deviation of the print position that occurs when the plurality of print sections 21 to 24 is used can be prevented.

The deviation amount obtaining section 33 includes the calculator 35 learned by machine learning so as to output the deviation amount Sp of the print position using the ink amount Xp estimated by the ink amount estimating section 32 and the tension T detected by the tension detecting section 14, as inputs. Therefore, even when it is difficult to represent a relationship between the deviation amount Sp and the ink amount Xp or the tension T using a formula or the like, the deviation amount Sp can be obtained with high accuracy based on the ink amount Xp using the calculator 35 learned by machine learning.

Each of the print sections 21 to 24 includes the ten print heads 25 lined up in the width direction of the printing paper 9. The ink amount estimating section 32 estimates the ink amount Xp with respect to each of the ten areas R1 to R10 obtained by dividing the printing paper 9 in the width direction corresponding to the plurality of print heads 25. The deviation amount obtaining section 33 obtains the deviation amount Sp with respect to each of the areas R1 to R10. The print control section 34 individually controls the print positions by the ten print heads 25 based on the deviation amount Sp. With this, the print position by the print section in the upstream side in the transport direction and the print position by the print section in the downstream side in the transport direction can be matched, and the deviation of the print position that occurs when the plurality of print sections 21 to 24 is used can be prevented effectively.

As a modification example of the first embodiment, a printing apparatus described below can be configured. In the printing apparatus according to the modification example, the deviation amount obtaining section 33 has a configuration shown in FIG. 8. The deviation amount obtaining section 33 shown in FIG. 8 includes the calculator 35 and a deviation amount calculating section 36. In this case, only the ink amount Xp that is input to the deviation amount obtaining section 33 is input to the calculator 35. The calculator 35 is learned by machine learning so as to output a tentative deviation amount of the print position using the ink amount Xp as an input. The deviation amount calculating section 36 obtains the deviation amount Sp based on an output of the calculator 35 and the tension T detected by the tension detecting section 14. The deviation amount calculating section 36 obtains the deviation amount Sp based on the output of the calculator 35 and the tension T, using a method of performing a calculation, a method of referring to a table, or the like. Also according to the printing apparatus according to the modification example, effects similar to those obtained by the printing apparatus 1 according to the first embodiment can be obtained.

Hereinafter, in the print sections 21 to 24, a print section provided in the upstream side in the transport direction is referred to as a first print section, and a print section provided in the downstream side in the transport direction is referred to as a second print section. Furthermore, print data supplied to the first print section is referred to as first print data, print data supplied to the second print section is referred to as second print data, ink ejected from the first print section is referred to as first ink, and ink ejected from the second print section is referred to as second ink.

As described above, the printing apparatus 1 according to the present embodiment includes the transport section (the plurality of rollers 11, and the like) that transports a continuous print base material (printing paper 9) in a predetermined transport direction, the first print section that ejects the first ink to the print base material based on the first print data, the second print section that is provided in the downstream side of the first print section in the transport direction and ejects the second ink to the print base material based on the second print data, the ink amount estimating section 32 that estimates the amount of ink ejected to the print base material from before printing by the first print section to before printing by the second print section, based on print data including the first print data (print data including the image data Dk, Dc, Dm), the deviation amount obtaining section 33 that obtains the deviation amount Sp between the print position by the first print section and the print position by the second print section at least based on the ink amount Xp estimated by the ink amount estimating section 32, and the print control section 34 that controls the print position by the second print section based on the deviation amount Sp.

In this manner, the printing apparatus 1 estimates the amount of ink ejected to the print base material from before printing by the first print section to before printing by the second print section, obtains the deviation amount Sp between the print position by the first print section and the print position by the second print section based on the estimated ink amount Xp, and controls the print position by the second print section based on the obtained deviation amount Sp. Therefore, according to the printing apparatus 1 according to the present embodiment, the print position by the first print section and the print position by the second print section can be matched, and the deviation of the print position that occurs when the plurality of print sections 21 to 24 is used can be prevented.

The printing apparatus 1 includes the tension detecting section 14 that detects the tension T applied to the print base material that is being transported by the transport section. The deviation amount obtaining section 33 obtains the deviation amount Sp at least based on the ink amount Xp and the tension T. Therefore, based on the deviation amount Sp obtained at least based on the ink amount Xp and the tension T, the print position by the first print section and the print position by the second print section can be matched, and the deviation of the print position that occurs when the plurality of print sections 21 to 24 is used can be prevented.

Figure 8:
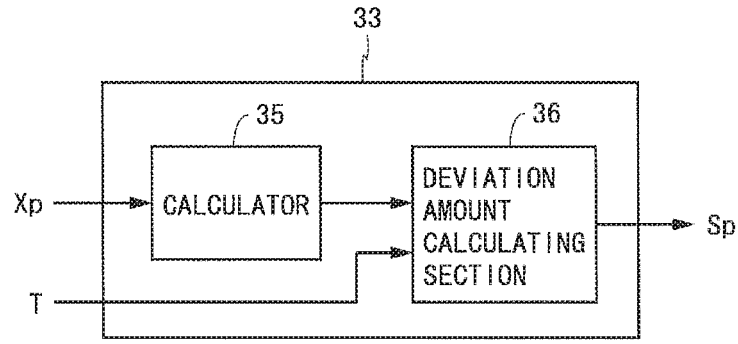
FIG. 8 is a block diagram showing a configuration of a deviation amount obtaining section of a printing apparatus according to a modification example.

The deviation amount obtaining section 33 includes the calculator 35 that is learned by machine learning and outputs the deviation amount Sp using at least the ink amount Xp as an input (FIGS. 5 and 8). The deviation amount obtaining section 33 may include the calculator 35 that is learned by machine learning and uses at least the ink amount Xp as an input, and may obtain the deviation amount Sp based on the output of the calculator 35 (FIG. 8). Therefore, even when it is difficult to represent a relationship between the ink amount Xp and the deviation amount Sp using a formula or the like, the deviation amount Sp can be obtained with high accuracy based on the ink amount Xp using the calculator 35 learned by machine learning. Furthermore, the deviation amount obtaining section 33 includes the calculator 35 that is learned by machine learning and outputs the deviation amount Sp using at least the ink amount Xp and the tension T as inputs (FIG. 5). Therefore, even when it is difficult to represent a relationship between the deviation amount Sp and the ink amount Xp or the tension T using a formula or the like, the deviation amount Sp can be obtained with high accuracy based on the ink amount Xp and the tension T using the calculator 35 learned by machine learning.

The printing apparatus 1 includes the test data storage section 41 that stores the test data TD, the image capturing section 43 that captures the test printed matter obtained by printing on the print base material using the test data TD, and the deviation amount measuring section 44 that measures the deviation amount St in the test printed matter based on the image captured by the image capturing section 43. The calculator 35 included in the deviation amount obtaining section 33 is learned by machine learning using at least the ink amount Xt estimated based on the test data TD and the deviation amount St measured by the deviation amount measuring section 44. Therefore, machine learning of the calculator 35 can be performed using the test data storage section 41, the image capturing section 43, and the deviation amount measuring section 44, and the deviation amount Sp can be obtained with high accuracy based on the ink amount Xp and the like using the learned calculator 35.

The second print section includes the plurality of print heads 25 lined up in the width direction of the print base material, the ink amount estimating section 32 estimates the ink amount Xp with respect to each of the plurality of areas (areas R1 to R10) obtained by dividing the print base material in the width direction corresponding to the plurality of print heads 25, the deviation amount obtaining section 33 obtains the deviation amount Sp with respect to each of the plurality of areas, and the print control section 34 individually controls the print positions by the plurality of print heads 25 based on the deviation amount Sp. With this, the print position by the first print section and the print position by the second print section can be matched, and the deviation of the print position that occurs when the plurality of print sections 21 to 24 is used can be prevented effectively.

The print control section 34 individually controls the print timings of the plurality of print heads 25 based on the deviation amount in the transport direction included in the deviation amount Sp. With this, the deviation of the print position in the transport direction that occurs when the plurality of print sections 21 to 24 is used can be prevented easily. The print control section 34 individually controls the print positions by the plurality of print heads 25 in the width direction based on the deviation amount in the width direction included in the deviation amount Sp. With this, the deviation of the print position in the width direction that occurs when the plurality of print sections 21 to 24 is used can be prevented. The first ink is ink for printing a first color component image constituting one color image, and the second ink is ink for printing a second color component image constituting the color image. Therefore, in a color printing apparatus having the plurality of print sections 21 to 24, the deviation of the print position can be prevented among the plurality of colors.

Second Embodiment

A printing apparatus according to a second embodiment of the present invention is obtained based on the printing apparatus according to the first embodiment by adding a data supply section and modifying a configuration of the deviation amount obtaining section. Differences from the first embodiment will be described below.

Figure 9:
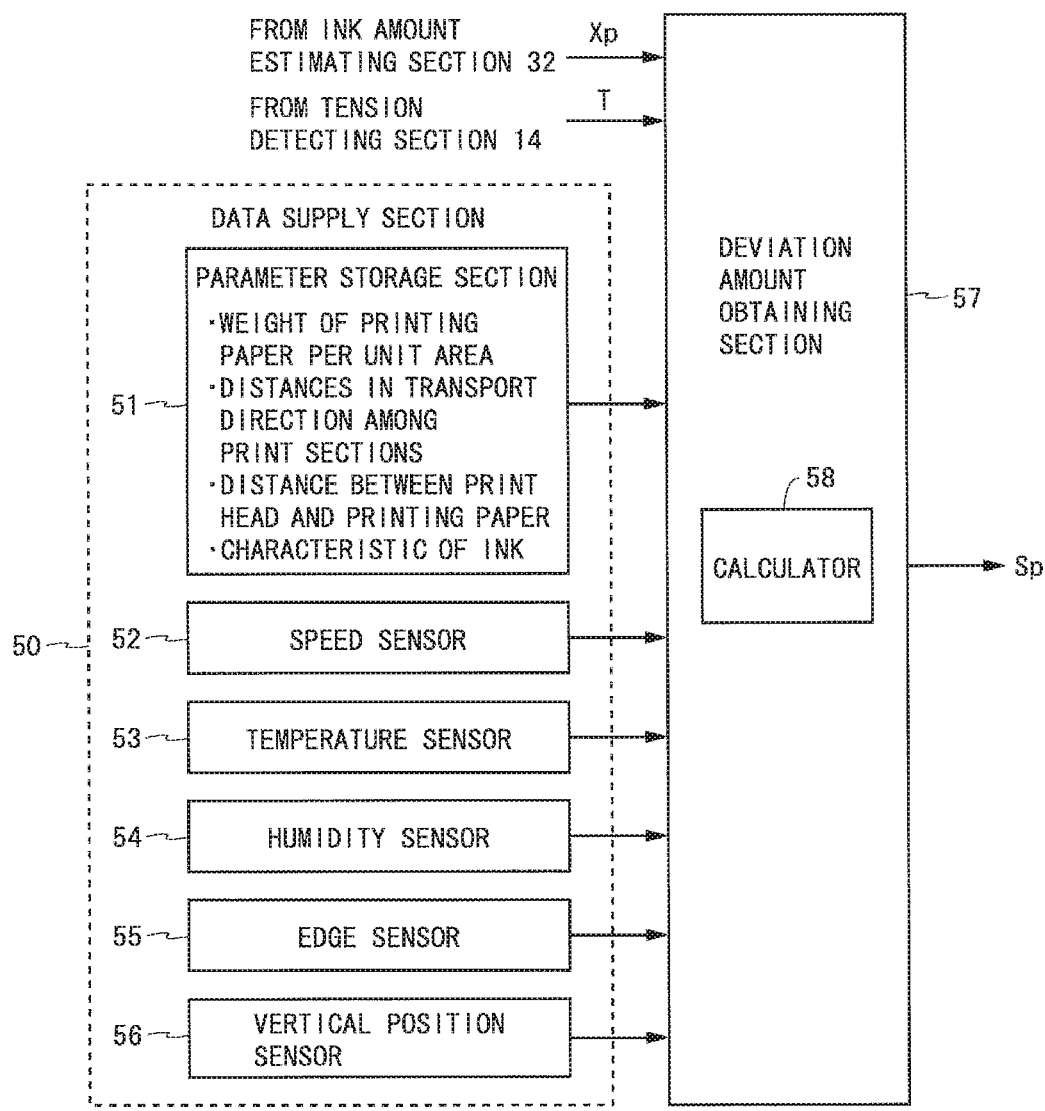
FIG. 9 is a block diagram showing a part of a printing apparatus according to a second embodiment of the present invention.

FIG. 9 is a block diagram showing a part of the printing apparatus according to the present embodiment. FIG. 9 describes a data supply section 50 and a deviation amount obtaining section 57. The data supply section 50 includes a parameter storage section 51, a speed sensor 52, a temperature sensor 53, a humidity sensor 54, an edge sensor 55, and a vertical position sensor 56. The deviation amount obtaining section 57 includes a calculator 58 capable of performing machine learning.

The parameter storage section 51 stores a weight of the printing paper 9 per unit area, distances in the transport direction among the print sections 21 to 24, a distance between the print head 25 and the printing paper 9, and a characteristic of the ink ejected from the print sections 21 to 24. The speed sensor 52 detects a transport speed of the printing paper 9 that is being transported by the transport section. The temperature sensor 53 detects an ambient temperature of the printing paper 9. The humidity sensor 54 detects an ambient humidity of the printing paper 9. The edge sensor 55 detects an edge position of the printing paper 9 that is being transported by the transport section. The vertical position sensor 56 detects a position in the vertical direction of the printing paper 9 that is being transported by the transport section (a position of the printing paper 9 in a direction perpendicular to a surface). Values stored in the parameter storage section 51 and outputs from the speed sensor 52, the temperature sensor 53, the humidity sensor 54, the edge sensor 55, and the vertical position sensor 56 are input to the deviation amount obtaining section 57.

Figure 10:
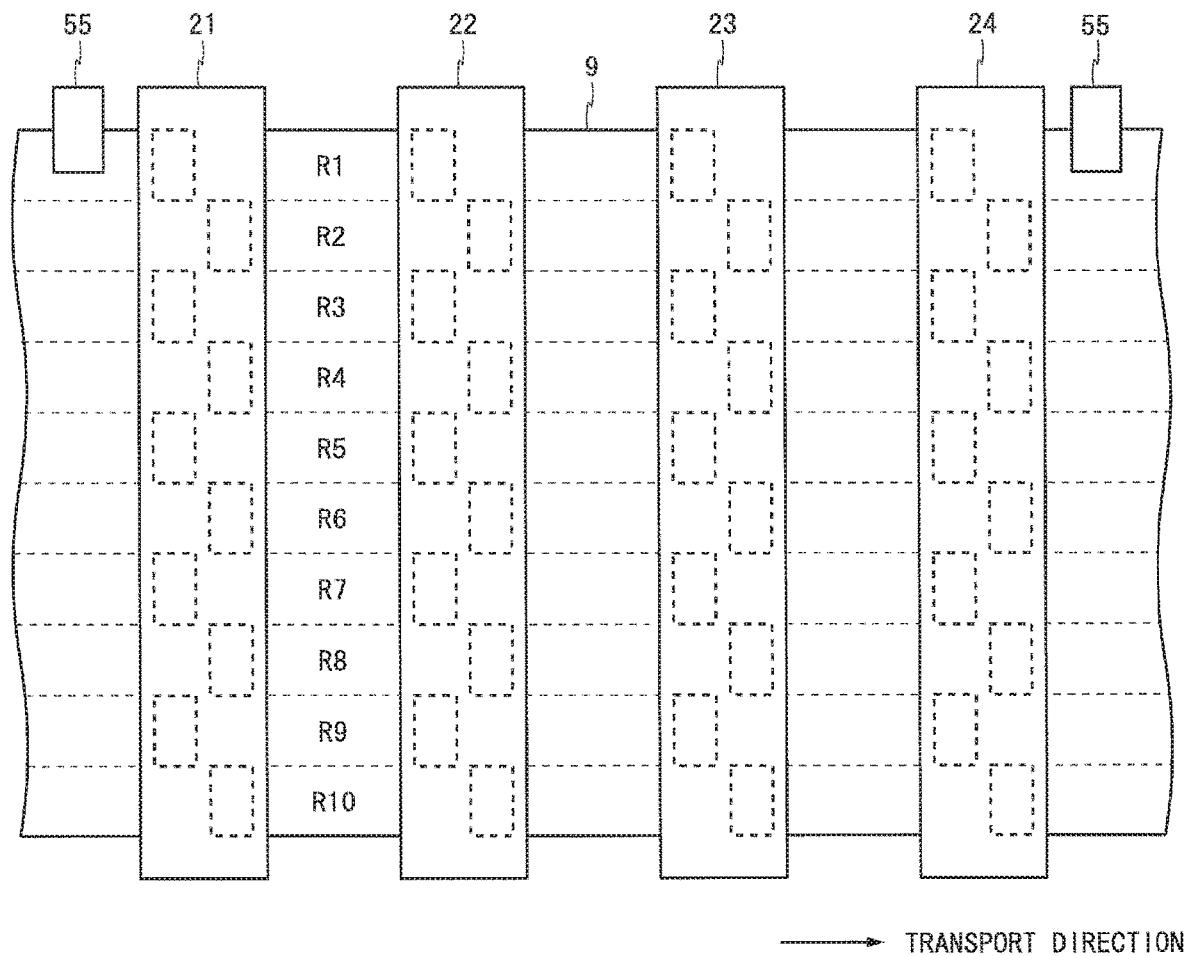
FIG. 10 is a diagram showing an arrangement position of an edge sensor in the printing apparatus according to the second embodiment.

FIG. 10 is a diagram showing an arrangement position of the edge sensor 55. As shown in FIG. 10, the printing apparatus according to the present embodiment includes two edge sensors 55. One edge sensor 55 is provided near an edge in the upstream side of the print section 21 in the transport direction, and detects an edge position in the upstream side of the print section 21 in the transport direction. The other edge sensor 55 is provided near an edge in the downstream side of the print section 24 in the transport direction, and detects an edge position in the downstream side of the print section 24 in the transport direction.

Figure 11:
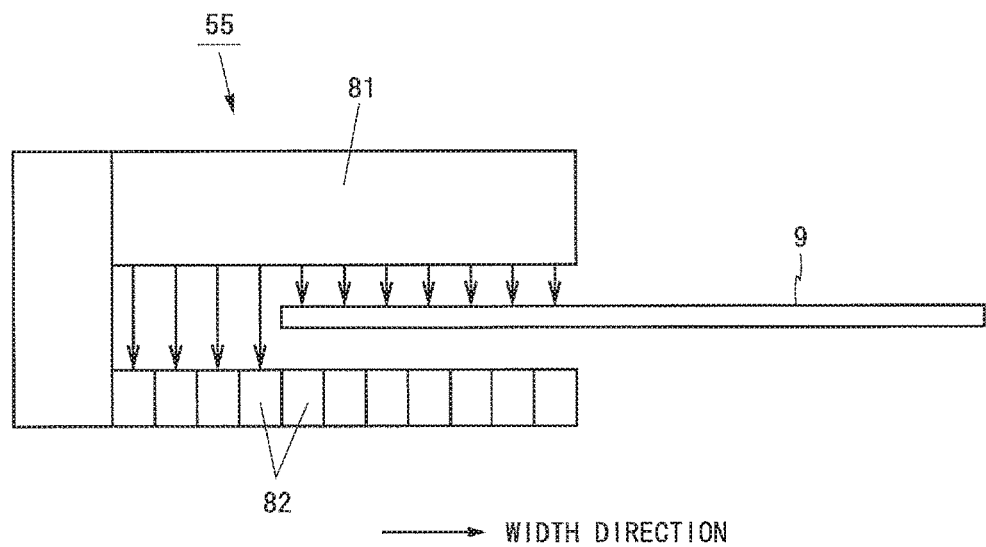
FIG. 11 is a schematic diagram showing a structure of the edge sensor of the printing apparatus according to the second embodiment.

FIG. 11 is a schematic diagram showing a structure of the edge sensor 55. As shown in FIG. 11, the edge sensor 55 includes a light emitting section 81 and a plurality of light receiving sections 82. The light emitting section 81 emits light in the vertical direction of the printing paper 9 (top-to-bottom direction in the drawing) from a plurality of positions lined up in the width direction of the printing paper 9. The plurality of light receiving sections 82 is arranged in the width direction of the printing paper 9 so as to face the light emitting section 81, and receives light emitted from the light emitting section 81. An edge portion of the printing paper 9 is sandwiched between the light emitting section 81 and the plurality of light receiving sections 82. A light receiving section 82 arranged at a position where the printing paper 9 does not exist receives light emitted from the light emitting section 81. A light receiving section 82 arranged at a position where the printing paper 9 exists does not receive light emitted from the light emitting section 81. Therefore, the edge position of the printing paper 9 can be detected based on outputs of the plurality of light receiving sections 82.

Figure 12:
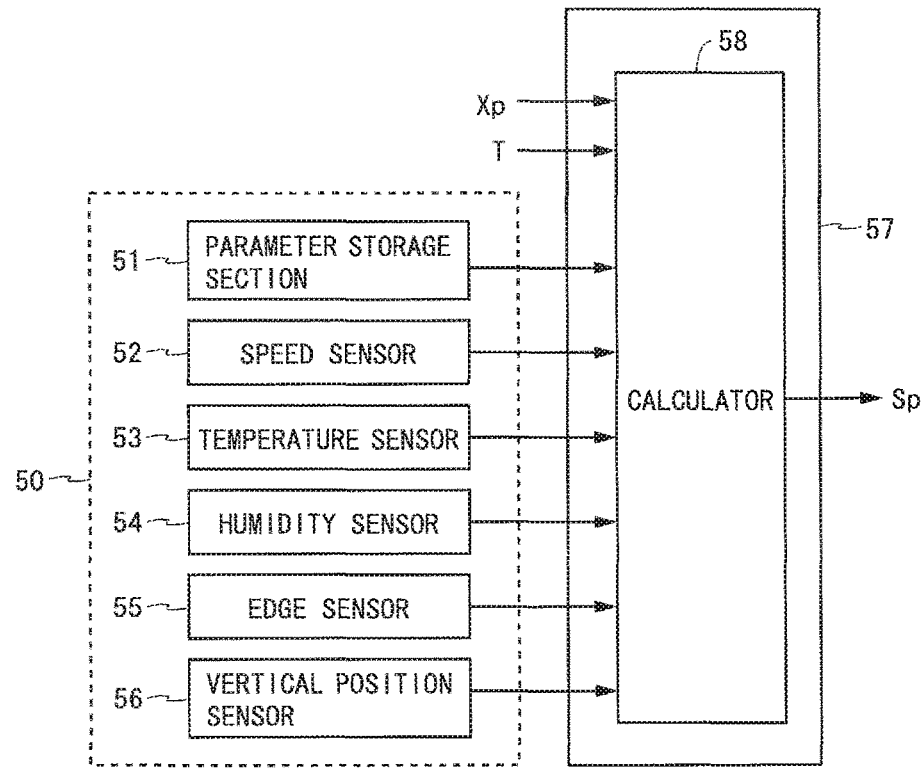
FIG. 12 is a block diagram showing a configuration of a deviation amount obtaining section of the printing apparatus according to the second embodiment.

FIG. 12 is a block diagram showing a configuration of the deviation amount obtaining section 57. As shown in FIG. 12, the ink amount Xp and the tension T that are input to the deviation amount obtaining section 57, and data supplied from the data supply section 50 are input to the calculator 58. The data supplied from the data supply section 50 includes the weight of the printing paper 9 per unit area, the transport speed of the printing paper 9, the ambient temperature of the printing paper 9, the ambient humidity of the printing paper 9, the edge position of the printing paper 9, the position of the printing paper 9 in the vertical direction, the distances in the transport direction among the print sections 21 to 24, the distance between the print head 25 and the printing paper 9, and the characteristic of the ink ejected from the print sections 21 to 24. All of these data have a correlation with the deviation amount of the print position.

The data supply section 50 may supply a part of the above-described data to the deviation amount obtaining section 57. The data supplied from the data supply section 50 may include at least one of the weight of the printing paper 9 per unit area, the transport speed of the printing paper 9, the ambient temperature of the printing paper 9, the ambient humidity of the printing paper 9, the edge position of the printing paper 9, the position of the printing paper 9 in the vertical direction, the distances in the transport direction among the print sections 21 to 24, the distance between the print head 25 and the printing paper 9, and the characteristic of the ink ejected from the print sections 21 to 24.

The calculator 58 is learned by machine learning so as to output the deviation amount of the print position using the ink amount Xp, the tension T, and the data supplied from the data supply section 50, as inputs. As with the first embodiment, when the ink amount Xp estimated by the ink amount estimating section 32 (one of the K ink amount, the KC ink amount, and the KCM ink amount) and the tension T are input to the calculator 58, the calculator 58 outputs the deviation amount. The deviation amount obtaining section 57 outputs an output of the calculator 58 as the deviation amount Sp to the print control section 34.

In the printing apparatus according to the present embodiment, the deviation amount obtaining section 57 obtains the deviation amount Sp between the print position by the first print section (print section in the upstream side in the transport direction) and the print position by the second print section (print section in the downstream side in the transport direction) based on the ink amount Xp estimated by the ink amount estimating section 32, the tension T detected by the tension detecting section 14, and the data supplied from the data supply section 50. According to the printing apparatus according to the present embodiment, as with the first embodiment, the deviation of the print position between the first print section and the second print section can be prevented, and the deviation of the print position can be prevented among the plurality of colors.

As a modification example of the second embodiment, a printing apparatus described below can be configured. In the printing apparatus according to the modification example, the deviation amount obtaining section 57 has a configuration shown in FIG. 13. The deviation amount obtaining section 57 shown in FIG. 13 includes the calculator 58 and a deviation amount calculating section 59. In this case, the ink amount Xp and the tension T that are input to the deviation amount obtaining section 57, and a part of the data supplied from the data supply section 50 (here, the weight of the printing paper 9 per unit area, the distances in the transport direction among the print sections 21 to 24, the distance between the print head 25 and the printing paper 9, the characteristic of the ink ejected from the print sections 21 to 24, and the transport speed of the printing paper 9) are input to the calculator 58. The calculator 58 is learned by machine learning so as to output a tentative deviation amount of the print position using the ink amount Xp, the tension T, and the part of the data supplied from the data supply section 50, as inputs. The deviation amount calculating section 59 obtains the deviation amount Sp based on the output of the calculator 58 and a remaining part of the data supplied from the data supply section 50 (the ambient temperature of the printing paper 9, the ambient humidity of the printing paper 9, the edge position of the printing paper 9, and the position of the printing paper 9 in the vertical direction). The deviation amount calculating section 59 obtains the deviation amount Sp based on the output of the calculator 58 and the remaining part of the data supplied from the data supply section 50 using a method of performing a calculation, a method of referring to a table, or the like. Also according to the printing apparatus according to the modification example, effects similar to those obtained by the printing apparatus according to the second embodiment can be obtained.

Figure 13:
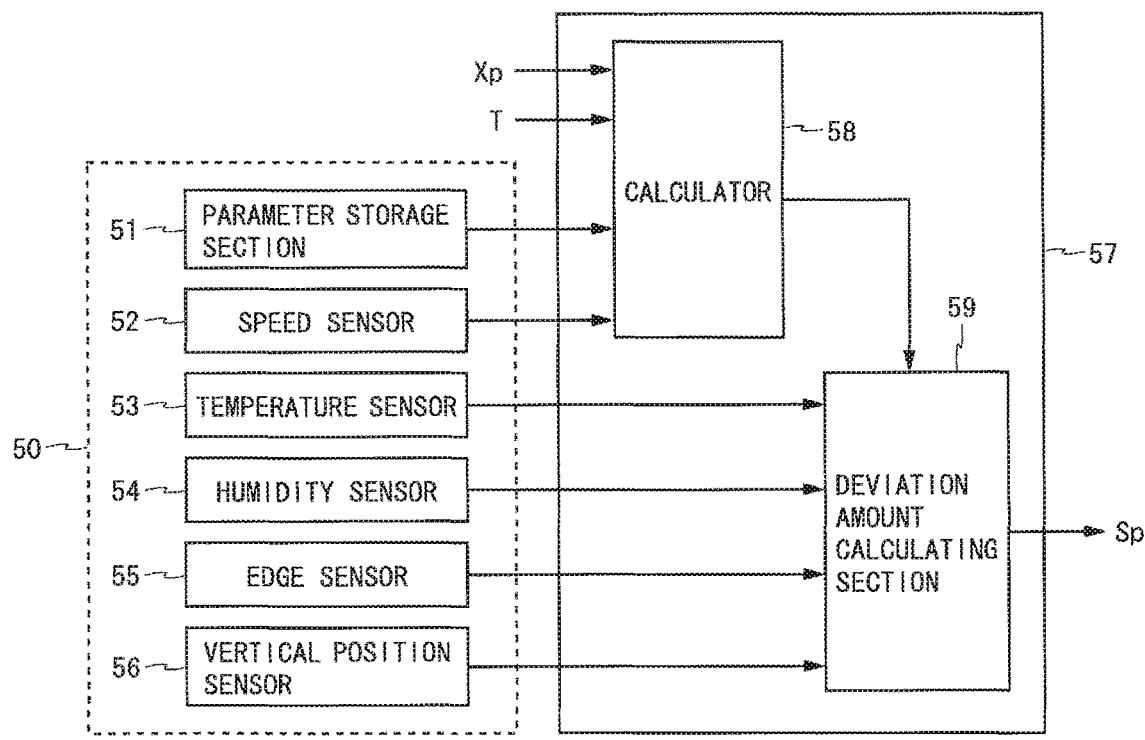
FIG. 13 is a block diagram showing a configuration of a deviation amount obtaining section of a printing apparatus according to a modification example.

When the data supplied from the data supply section 50 is divided to input to the calculator 58 and the deviation amount calculating section 59, the supplied data may be divided by a method other than the method shown in FIG. 13. In general, when n pieces of data having a correlation with the deviation amount Sp are supplied from the data supply section 50, arbitrary k pieces of data (k is an integer not smaller than 1 and not larger than n) in the n pieces of data may be input to the calculator 58, and remaining (n–k) pieces of data may be input to the deviation amount calculating section 59.

As described above, the printing apparatus according to the present embodiment includes the data supply section 50 that supplies data having a correlation with the deviation amount Sp. The deviation amount obtaining section 57 obtains the deviation amount Sp based on the ink amount Xp, the tension T, and the data supplied from the data supply section 50. In this manner, by obtaining the deviation amount Sp based on the ink amount Xp estimated by the ink amount estimating section 32, the tension T detected by the tension detecting section 14, and the data having the correlation with the deviation amount Sp, and controlling the print position by the second print section based on the obtained deviation amount, the print position by the first print section and the print position by the second print section can be matched, and the deviation of the print position that occurs when the plurality of print sections 21 to 24 is used can be prevented.

The deviation amount obtaining section 57 includes the calculator 58 that is learned by machine learning and outputs the deviation amount Sp using the ink amount Xp, the tension T, and the data supplied from the data supply section 50, as inputs (FIG. 12). The deviation amount obtaining section 57 may include the calculator 58 learned by machine learning using the ink amount Xp, the tension T, and a part of the data supplied from the data supply section 50, as inputs, and may obtain the deviation amount Sp based on the output of the calculator 58 and a remaining part of the data supplied from the data supply section 50 (FIG. 13). Therefore, even when it is difficult to represent a relationship between the deviation amount Sp and the ink amount Xp, the tension T, or the data having the correlation with the deviation amount Sp using a formula or the like, the deviation amount Sp can be obtained with high accuracy based on the ink amount Xp, the tension T, and the data having the correlation with the deviation amount Sp using the calculator 58 learned by machine learning. The deviation amount obtaining section 57 includes the calculator 58 learned by machine learning using at least the ink amount Xp and the tension T as inputs, and obtains the deviation amount Sp based on the output of the calculator 58 (FIG. 13). Therefore, even when it is difficult to represent a relationship between the deviation amount Sp and the ink amount Xp or the tension T using a formula or the like, the deviation amount Sp can be obtained with high accuracy based on the ink amount Xp and the tension T using the calculator 58 learned by machine learning.

The data supplied from the data supply section 50 include at least one of a weight of the print base material (printing paper 9) per unit area, a transport speed of the print base material, an ambient temperature of the print base material, an ambient humidity of the print base material, an edge position of the print base material, a position of the print base material in the direction perpendicular to a surface, a distance in the transport direction between the first print section and the second print section, a distance between the print head 25 included in the second print section and the print base material, and the characteristic of the ink. In this manner, by obtaining the deviation amount based on at least one of the above-described data in addition to the ink amount Xp and the tension T, and controlling the print position by the second print section (print section in the downstream side in the transport direction) based on the obtained deviation amount, the print position by the first print section (print section in the upstream side in the transport direction) and the print position by the second print section can be matched, and the deviation of the print position that occurs when the plurality of print sections 21 to 24 is used can be prevented effectively.

Third Embodiment

Figure 14:
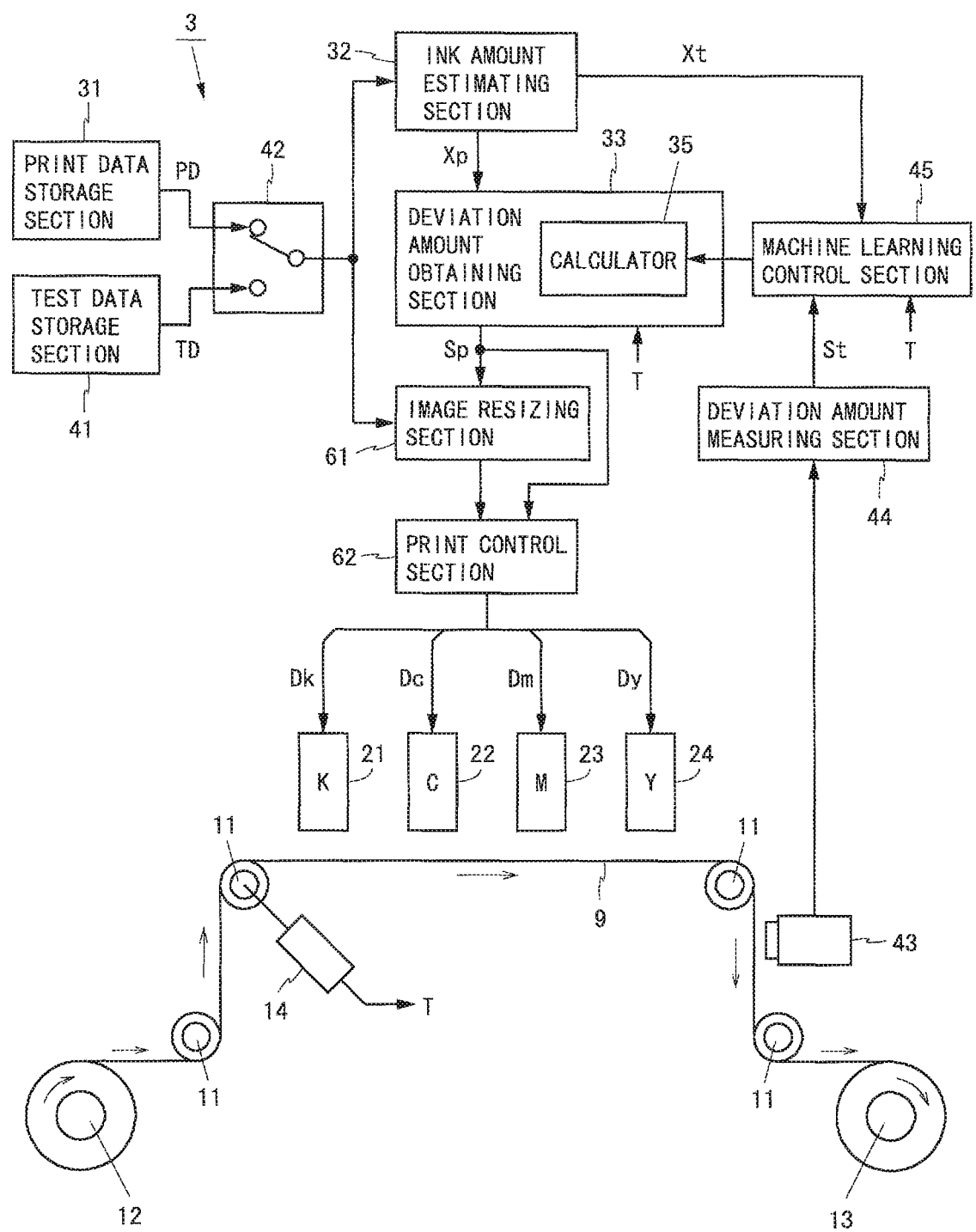
FIG. 14 is a block diagram showing a configuration of a printing apparatus according to a third embodiment of the present invention.

FIG. 14 is a block diagram showing a configuration of a printing apparatus according to a third embodiment of the present invention. A printing apparatus 3 shown in FIG. 14 is obtained based on the printing apparatus 1 according to the first embodiment by adding an image resizing section 61 and replacing the print control section 34 with a print control section 62. Among the components of the present embodiment, as for the same components as those in the first embodiment, the same reference symbols are provided and their descriptions are omitted.

The print data PD selected by the data selecting section 42 is supplied to the ink amount estimating section 32 and the image resizing section 61. The ink amount estimating section 32 and the deviation amount obtaining section 33 operate in a manner similar to those in the first embodiment. The deviation amount obtaining section 33 outputs the obtained deviation amount Sp to the print control section 34 and the image resizing section 61.

The image resizing section 61 resizes images represented by image data supplied to the print sections 22 to 24 in the width direction with respect to each of the areas R1 to R10, based on the deviation amount in the width direction included in the deviation amount Sp obtained by the deviation amount obtaining section 33. More specifically, the image resizing section 61 resizes the cyan image represented by the cyan image data Dc supplied to the print section 22 in the width direction with respect to each area, based on the deviation amount in the width direction between the print position by the print section 21 and the print position by the print section 22. The image resizing section 61 resizes the magenta image represented by the magenta image data Dm supplied to the print section 23 in the width direction with respect to each area, based on the deviation amount in the width direction between the print position by the print section 21 and the print position by the print section 23. The image resizing section 61 resizes the yellow image represented by the yellow image data Dy supplied to the print section 24 in the width direction with respect to each area, based on the deviation amount in the width direction between the print position by the print section 21 and the print position by the print section 24.

The print control section 62 is obtained based on the print control section 34 according to the first embodiment by deleting a function of controlling the print position in the width direction based on the deviation amount in the width direction. As with the print control section 34, the print control section 62 individually controls the print timings of the plurality of print heads 25 included in the print sections 22 to 24 with respect to each of the areas R1 to R10, based on the deviation amount in the transport direction included in the deviation amount Sp obtained by the deviation amount obtaining section 33. On the other hand, unlike the print control section 34, the print control section 62 does not perform processing of individually controlling the print positions in the width direction of the plurality of print heads 25 included in the print sections 22 to 24 with respect to each of the areas R1 to R10, based on the deviation amount in the width direction included in the deviation amount Sp obtained by the deviation amount obtaining section 33.

In the printing apparatus 3, the print control section 62 does not perform processing of controlling the print position in the width direction based on the deviation amount in the width direction. In place of this, the image resizing section 61 resizes the images represented by the image data supplied to the print sections 22 to 24 in the width direction with respect to each area, based on the deviation amount in the width direction. According to the printing apparatus 3, the deviation of the print position in the width direction between the print section in the upstream side in the transport direction and the print section in the downstream side in the transport direction can be prevented, and the deviation of the print position can be prevented among the plurality of colors.

As described above, the printing apparatus 3 according to the present embodiment includes the image resizing section 61 that resizes an image represented by the second print data supplied to the second print section (print section in the downstream side in the transport direction) in the width direction, based on the deviation amount of the print base material (printing paper 9) in the width direction included in the deviation amount Sp obtained by the deviation amount obtaining section 33. Therefore, even when the second print section does not have a function of controlling the print position in the width direction, the deviation of the print position in the width direction that occurs when the plurality of print sections 21 to 24 is used can be prevented.

Fourth Embodiment

Figure 15:
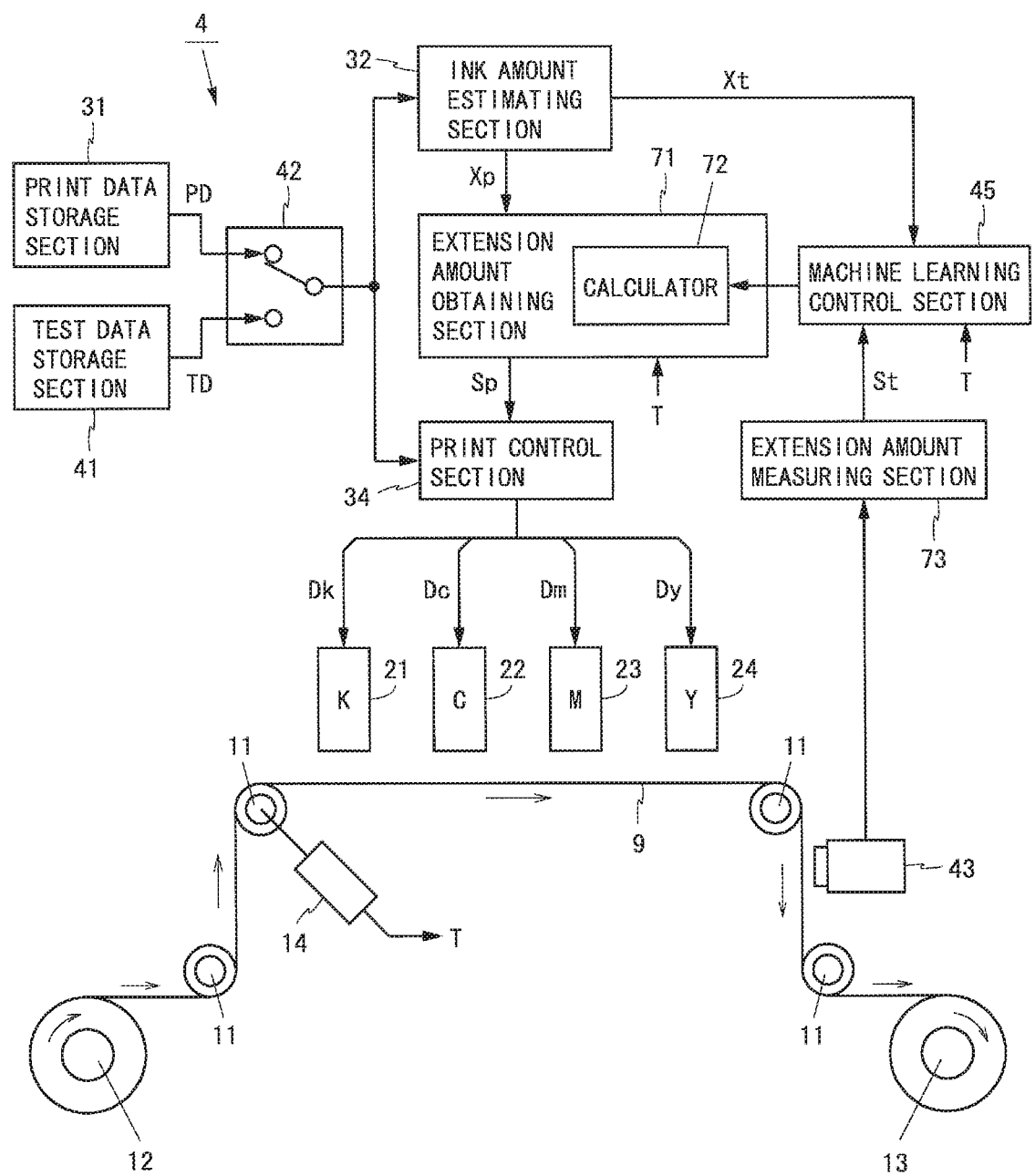
FIG. 15 is a block diagram showing a configuration of a printing apparatus according to a fourth embodiment of the present invention.
Figure 16:
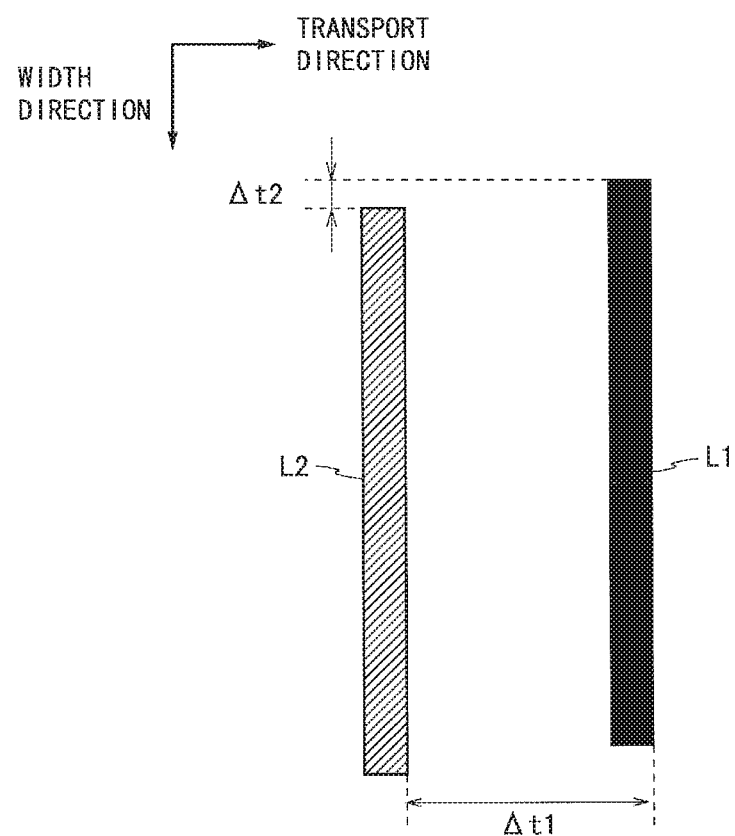
FIG. 16 is a diagram showing a deviation of a print position in a conventional color printing apparatus.

FIG. 15 is a block diagram showing a configuration of a printing apparatus according to a fourth embodiment of the present invention. A printing apparatus 4 shown in FIG. 15 is obtained based on the printing apparatus 1 according to the first embodiment by replacing the deviation amount obtaining section 33 and the deviation amount measuring section 44 with an extension amount obtaining section 71 and an extension amount measuring section 73, respectively. Among the components of the present embodiment, as for the same components as those in the first embodiment, the same reference symbols are provided and their descriptions are omitted.

The ink amount Xp estimated by the ink amount estimating section 32 and the tension T detected by the tension detecting section 14 are input to the extension amount obtaining section 71. The extension amount obtaining section 71 includes a calculator 72 capable of performing machine learning, and has a configuration similar to that of the deviation amount obtaining section 33 (see FIGS. 5 and 8).

When the extension amount obtaining section 71 has a configuration similar to that shown in FIG. 5, the calculator 72 is learned by machine learning so as to output an extension amount of the printing paper 9 using the ink amount and the tension as inputs. In other words, the calculator 72 is learned by machine learning using learning data in which the ink amount and the tension are feature values and the extension amount of the printing paper 9 is an objective variable. In this case, the extension amount obtaining section 71 outputs an output of the calculator 72 as an extension amount Ep.

When the extension amount obtaining section 71 has a configuration similar to that shown in FIG. 8, the calculator 72 is learned by machine learning so as to output the extension amount of the printing paper 9 using the ink amount as an input. The calculator 72 is a learning device learned by machine learning using learning data in which the ink amount is a feature value and the extension amount of the printing paper 9 is an objective variable. In this case, the extension amount obtaining section 71 obtains the extension amount Ep based on the output of the calculator 72 and the tension T.

The extension amount obtaining section 71 outputs the extension amount Ep obtained using the calculator 72, to the print control section 34. As with the first embodiment, the print control section 34 controls the print positions by the print sections 22 to 24 based on the extension amount Ep obtained by the extension amount obtaining section 71. The extension amount measuring section 73 measures an extension amount Et of the printing paper 9 on which the test data TD is printed, based on an image captured by the image capturing section 43. The measured extension amount Et is output to the machine learning control section 45.

According to the printing apparatus 4 according to the present embodiment, as with the first embodiment, the print position by the print section in the upstream side in the transport direction and the print position by the print section in the downstream side in the transport direction can be matched, and the deviation of the print position that occurs when the plurality of print sections is used can be prevented effectively.

As a modification example of the fourth embodiment, a printing apparatus described below can be configured. In the printing apparatus according to the modification example, the extension amount obtaining section 71 has a configuration similar to the deviation amount obtaining section 57 shown in FIGS. 12 and 13. When the extension amount obtaining section 71 has a configuration similar to that shown in FIG. 12, the calculator 72 is learned by machine learning so as to output the extension amount of the printing paper 9 using the ink amount Xp, the tension T, and the data supplied from the data supply section 50, as inputs. When the extension amount obtaining section 71 has a configuration similar to that shown in FIG. 13, the calculator 72 is learned by machine learning so as to output the extension amount of the printing paper 9 using the ink amount Xp, the tension T, and a part of the data supplied from the data supply section 50, as inputs.

The data supplied from the data supply section 50 include the weight of the printing paper 9 per unit area, the transport speed of the printing paper 9, the ambient temperature of the printing paper 9, the ambient humidity of the printing paper 9, the edge position of the printing paper 9, the position of the printing paper 9 in the vertical direction, the distances in the transport direction among the print sections 21 to 24, the distance between the print head 25 and the printing paper 9, and the characteristic of the ink ejected from the print sections 21 to 24. Also according to the printing apparatus according to the modification example, effects similar to those obtained by the fourth embodiment can be obtained.

As described above, the calculator 72 included in the printing apparatus 4 according to the present embodiment is a learning device learned about an extension amount of the continuous print base material (printing paper 9) in the printing apparatus 4 that ejects the ink from the print head 25 to the print base material, and is learned using learning data in which at least the amount of ink ejected from the print head 25 to the print base material and the tension applied to the print base material are feature values and the extension amount of the print base material is an objective variable. The calculator 72 may be learned by machine learning using the learning data further including, as a feature value, at least one of the weight of the print base material per unit area, the transport speed of the print base material, the ambient temperature of the print base material, the ambient humidity of the print base material, the edge position of the print base material, the position of the print base material in the direction perpendicular to the surface, the distance between the print head and the print base material, and the characteristic of the ink. Therefore, even when it is difficult to represent a relationship between the extension amount Ep and the ink amount Xp or the tension T using a formula or the like, the extension amount Ep can be obtained based on the ink amount Xp, the tension T, and the like using the calculator 72 learned by machine learning.

As with the first embodiment, the printing apparatus 4 according to the present embodiment includes the transport section, the first print section, the second print section, the ink amount estimating section 32, and the tension detecting section 14, and includes the extension amount obtaining section 71 that includes the calculator 72 and obtains the extension amount Ep of the print base material by providing the calculator 72 with at least the ink amount Xp estimated by the ink amount estimating section 32 and the tension T detected by the tension detecting section 14, and the print control section 34 that controls the print position by the second print section (print section in the downstream side in the transport direction) based on the obtained extension amount Ep.

According to the printing apparatus 4 according to the present embodiment, by obtaining the extension amount Ep of the print base material at least based on the ink amount Xp and the tension T using the learned calculator 72, and controlling the print position by the second print section based on the obtained extension amount Ep, the print position by the first print section (print section in the upstream side in the transport direction) and the print position by the second print section can be matched, and the deviation of the print position when the plurality of print sections 21 to 24 is used can be prevented.

As for the above-described printing apparatuses according to each of the embodiments, a variety of modification examples can be configured. For example, a printing apparatus according to a modification example does not necessarily perform processing of dividing the printing paper 9 in the width direction corresponding to the plurality of print heads 25. A printing apparatus according to a modification example does not include the test data storage section 41, the data selecting section 42, the image capturing section 43, the deviation amount measuring section 44, and the machine learning control section 45, and includes a calculator learned by machine learning. In this case, a calculator learned by machine learning by another printing apparatus having the same configuration is used as the calculator, for example.

In the above-described printing apparatuses, the four print sections 21 to 24 eject the black, cyan, magenta, and cyan ink in turn to the printing paper 9 that is being transported. In a printing apparatus according to a modification example, a plurality of print sections may eject the above-described ink of four colors in turn to the printing paper 9 that is being transported in other orders, or may eject ink having colors other than the above-described colors. A printing apparatus according to a modification example may include a plurality of print sections that ejects ink having the same color. A printing apparatus according to a modification example may print on a print base material other than the printing paper 9 (for example, film or the like).

Although the present invention is described in detail in the above, the above description is exemplary in all of the aspects and is not restrictive. It is understood that various other changes and modification can be derived without going out of the present invention.

This application claims a priority based on Japanese Patent Application No. 2019-178642 filed on Sep. 30, 2019 and entitled "Printing Apparatus", which is incorporated herein by reference in its entirety.

What is claimed is:

1. A printing apparatus comprising:
    a transport section configured to transport a continuous print base material in a predetermined transport direction;
    a first print section configured to eject first ink to the print base material based on first print data;
    a second print section provided in a downstream side of the first print section in the transport direction and configured to eject second ink to the print base material based on second print data;
    an ink amount estimating section configured to estimate an amount of ink ejected to the print base material from before printing by the first print section to before printing by the second print section, based on print data including the first print data;
    a deviation amount obtaining section configured to obtain a deviation amount between a print position by the first print section and a print position by the second print section at least based on the ink amount estimated by the ink amount estimating section; and
    a print control section configured to control the print position by the second print section based on the deviation amount.

2. The printing apparatus according to claim 1, further comprising a tension detecting section configured to detect tension applied to the print base material that is being transported by the transport section, wherein the deviation amount obtaining section obtains the deviation amount at least based on the ink amount and the tension.

3. The printing apparatus according to claim 2, wherein the deviation amount obtaining section includes a calculator learned by machine learning and configured to output the deviation amount using at least the ink amount and the tension as inputs.

4. The printing apparatus according to claim 2, wherein the deviation amount obtaining section includes a calculator learned by machine learning and configured to use at least the ink amount and the tension as inputs, and obtains the deviation amount based on an output of the calculator.

5. The printing apparatus according to claim 2, further comprising a data supply section configured to supply data having a correlation with the deviation amount, wherein the deviation amount obtaining section obtains the deviation amount based on the ink amount, the tension, and the data.

6. The printing apparatus according to claim 5, wherein the deviation amount obtaining section includes a calculator learned by machine learning and configured to output the deviation amount using the ink amount, the tension, and the data as inputs.

7. The printing apparatus according to claim 5, wherein the deviation amount obtaining section includes a calculator learned by machine learning and configured to use the ink amount, the tension, and a part of the data as inputs, and obtains the deviation amount based on an output of the calculator and a remaining part of the data.

8. The printing apparatus according to claim 5, wherein the data include at least one of a weight of the print base material per unit area, a transport speed of the print base material, an ambient temperature of the print base material, an ambient humidity of the print base material, an edge position of the print base material, a position of the print base material in a direction perpendicular to a surface, a distance in the transport direction between the first print section and the second print section, a distance between a print head included in the second print section and the print base material, and a characteristic of the ink.

9. The printing apparatus according to claim 1, wherein the deviation amount obtaining section includes a calculator learned by machine learning and configured to output the deviation amount using at least the ink amount as an input.

10. The printing apparatus according to claim 9, further comprising:
    a test data storage section configured to store test data;
    an image capturing section configured to capture a test printed matter obtained by printing on the print base material using the test data; and
    a deviation amount measuring section configured to measure a deviation amount in the test printed matter based on an image captured by the image capturing section, wherein
    the calculator is learned by machine learning at least using the ink amount estimated based on the test data and the deviation amount measured by the deviation amount measuring section.

11. The printing apparatus according to claim 1, wherein the deviation amount obtaining section includes a calculator learned by machine learning and configured to use at least the ink amount as an input, and obtains the deviation amount based on an output of the calculator.

12. The printing apparatus according to claim 1, wherein the second print section includes a plurality of print heads lined up in a width direction of the print base material, the ink amount estimating section estimates the ink amount with respect to each of a plurality of areas obtained by dividing the print base material in the width direction corresponding to the plurality of print heads, the deviation amount obtaining section obtains the deviation amount with respect to each of the plurality of areas, and the print control section individually controls print positions by the plurality of print heads based on the deviation amount.

13. The printing apparatus according to claim 12, wherein the print control section individually controls print timings of the plurality of print heads based on a deviation amount in the transport direction included in the deviation amount.

14. The printing apparatus according to claim 12, wherein the print control section individually controls the print positions by the plurality of print heads in the width direction based on a deviation amount in the width direction included in the deviation amount.

15. The printing apparatus according to claim 1, further comprising an image resizing section configured to resize an image represented by the second print data in a width direction, based on a deviation amount of the print base material in the width direction included in the deviation amount.

16. The printing apparatus according to claim 1, wherein the first ink is ink for printing a first color component image constituting one color image, and the second ink is ink for printing a second color component image constituting the color image.

17. The printing apparatus according to claim 1, wherein the deviation amount obtaining section is configured to estimate an extension amount based on the ink amount estimated by the ink amount estimating section, a distance in the transport direction between the first print section and the second print section, and a transport speed of the print base material, the extension amount being a deviation amount in the transport direction included in the deviation amount, and the print control section is configured to control a timing at which the second print section ejects the second ink, based on the extension amount.

18. The printing apparatus according to claim 1, further comprising a third print section provided in a downstream side of the second print section in the transport direction and configured to eject third ink to the print base material based on third print data, wherein the ink amount estimating section is configured to:
estimate a first ink amount based on the print data including the first print data, the first ink amount being an amount of ink ejected to the print base material from before printing by the first print section to before printing by the second print section, and estimate a second ink amount based on the print data including the first print data and the second print data, the second ink amount being an amount of ink ejected to the print base material from before printing by the first print section to before printing by the third print section, the deviation amount obtaining section is configured to:
obtain a first deviation amount based on the first ink amount, the first deviation amount being a deviation amount between the print position by the first print section and the print position by the second print section, and obtain a second deviation amount based on the second ink amount, the second deviation amount being a deviation amount between the print position by the first print section and a print position by the third print section, and the print control section is configured to:
control the print position by the second print section based on the first deviation amount, and
control the print position by the third print section based on the second deviation amount.

19. The printing apparatus according to claim 1, further comprising:

a third print section provided in a downstream side of the second print section in the transport direction and configured to eject third ink to the print base material based on third print data, and a fourth print section provided in a downstream side of the third print section in the transport direction and configured to eject fourth ink to the print base material based on fourth print data, wherein the ink amount estimating section is configured to:
estimate a first ink amount based on the print data including the first print data, the first ink amount being an amount of ink ejected to the print base material from before printing by the first print section to before printing by the second print section, estimate a second ink amount based on the print data including the first print data and the second print data, the second ink amount being an amount of ink ejected to the print base material from before printing by the first print section to before printing by the third print section, and estimate a third ink amount based on the print data including the first print data, the second print data and the third print data, the third ink amount being an amount of ink ejected to the print base material from before printing by the first print section to before printing by the fourth print section, the deviation amount obtaining section is configured to:
obtain a first deviation amount based on the first ink amount, the first deviation amount being a deviation amount between the print position by the first print section and the print position by the second print section, obtain a second deviation amount based the second ink amount, the second deviation amount being a deviation amount between the print position by the first print section and a print position by the third print section, and obtain a third deviation amount based on the third ink amount, the third deviation amount being a deviation amount between the print position by the first print section and a print position by the fourth print section, and the print control section is configured to:
control the print position by the second print section based on the first deviation amount,
control the print position by the third print section based on the second deviation amount, and
control the print position by the fourth print section based on the third deviation amount.

20. A printing apparatus comprising:
a transport section configured to transport a continuous print base material in a predetermined transport direction;
a first print section configured to eject first ink to the print base material based on first print data;

a second print section provided in a downstream side of the first print section in the transport direction and configured to eject second ink to the print base material based on the second print data;

an ink amount estimating section configured to estimate an amount of ink ejected to the print base material from before printing by the first print section to before printing by the second print section, based on print data including the first print data;

a tension detecting section configured to detect tension applied to the print base material that is being transported by the transport section;

an extension amount obtaining section including a learning device trained about an extension amount of the print base material, the learning device is trained by machine learning using learning data in which at least an amount of ink ejected from a print head to a print base material and tension applied to the print base material are feature values and the extension amount of the print base material is an objective variable, the extension amount obtaining section being configured to provide the learning device with at least the ink amount estimated by the ink amount estimating section and the tension detected by the tension detecting section to obtain the extension amount of the print base material; and a print control section configured to control a print position by the second print section based on the extension amount.

* * * * *